(12) United States Patent
El-Tahan et al.

(10) Patent No.: US 6,611,737 B1
(45) Date of Patent: Aug. 26, 2003

(54) ADVANCED SHIP AUTOPILOT SYSTEM

(75) Inventors: Mona El-Tahan, St. John's (CA); Hussein El-Tahan, St. John's (CA); Kevin Tuer, Stratford (CA); Mauro Rossi, Cambridge (CA)

(73) Assignee: Canadian Space Agency, Saint-Hubert (CA)

( * ) Notice: Subject to any disclaimer, the term of this patent is extended or adjusted under 35 U.S.C. 154(b) by 0 days.

(21) Appl. No.: 09/959,336
(22) PCT Filed: Apr. 20, 2000
(86) PCT No.: PCT/CA00/00448

§ 371 (c)(1),
(2), (4) Date: Dec. 20, 2001

(87) PCT Pub. No.: WO00/65417

PCT Pub. Date: Nov. 2, 2000

Related U.S. Application Data

(60) Provisional application No. 60/130,528, filed on Apr. 23, 1999.

(51) Int. Cl.[7] .................................................. G05D 1/02
(52) U.S. Cl. ......................................... 701/21; 701/205
(58) Field of Search ......................... 701/21, 224, 205; 700/29, 30, 31; 706/905

(56) References Cited

U.S. PATENT DOCUMENTS 5,485,545 A * 1/1996 Kojima et al. ................. 706/23

OTHER PUBLICATIONS

Kaynak, Internal Model Control With A Predictive Action For Ship Steering, IEEE, IECON '90, Nov. 1990.*
El–Tahan et al., Ship Predictor System (SPS), IEEE, CCECE '97, 1997.*
Wang et al., Adaptive Generalized Predictive Control For Nonlinear Systems Using Neural Networks, IEEE, Dec. 1996, ICIT '96 pp. 806–810.*
Burns, The Use Of Artificial Neural Networks For The Intelligent Optimal Control Of Surface Ships, IEEE, Jan. 1995, vol. 20. iss 1, pp. 65–72.*
Norgaard et al., Intelligent Predictive Control of Nonlinear Processes Using Neural Networks, IEEE, Sep. 1996, pp. 301–306.*
Geng et al., Application Of A Neural–Network–Based RLS Algorithm In The Generalized Predictive Control Of A Nonlinear Air–Handling Plant, IEEE, Jul. 1997, vol. 5, iss. 4, pp. 439–445.*

* cited by examiner

Primary Examiner—Michael J. Zanelli
(74) Attorney, Agent, or Firm—Freedman & Associates

(57) ABSTRACT

A navigation controller and method for performing navigation control are provided. According to the method, a time varying prediction model is determined based on a predictor having a model component and a correlation processor component. The time varying linear prediction model is then used to formulate a predictive controller or to update the controller in use. The controller is then used to control navigation. Because of the correlation processor, the predictor is better adapted to compensate for shortcomings in the model thus making the automated navigation control superior. In use, the method controls vessel navigation in any of a number of predefined modes such as cruising and turning modes. Moreover, through the selection of the operational scenario, the controller can be made to adapt to differing control objectives—for example tight tracking or increased operational efficiency of the vessel.

31 Claims, 27 Drawing Sheets

ADVANCED SHIP AUTOPILOT SYSTEM

This application is a national phase entry of International Application No. PCT/CA00/00448 filed Apr. 20, 2000, which claims priority from United States Provisional Patent Application No. 60/130,528 filed Apr. 23, 1999, now abandoned.

FIELD OF THE INVENTION

The invention relates to an automated system for navigation control and more particularly to the use of non-linear prediction mechanisms used in conjunction with a predictive controller.

BACKGROUND OF THE INVENTION

Automatic systems for ship control have been in existence for several years. These systems are being utilized for forward speed control, course-keeping, rudder roll stabilization, and dynamic ship positioning. Existing autopilot systems are mainly used to maintain a heading (longitudinal axis) of a ship in a predefined direction. Environmental disturbances, such as wind and water currents, may cause the ship to move in a direction that is several degrees off its intended heading. As a result, these autopilots are not capable of accurately keeping the ship on a predefined track, which is critical for navigation in restricted waterways. The impetus behind the development of a track-keeping autopilot stems from confined waterway navigation in which there is little margin for navigational errors. The development of a track-keeping autopilot became feasible with the advent of the Differential Global Positioning System (DGPS).

Predictive controllers are a well known form of controller and their use in the process control industry is well established. However, many predictive control methods require an analytical, closed form linear prediction model to formulate the control law. Such models can be somewhat restrictive in the ability to accurately represent a process and thus, the ensuing control law may not perform as required.

It has now been found that a modified generalized predictive controller using an external correlation processor for performing prediction can be implemented resulting in excellent control results even in substantially non-linear environments such as ship navigation and control.

SUMMARY OF THE INVENTION

The ASAS is an advanced track-keeping autopilot. It combines the predictive capabilities of a correlation based Ship Predictor System (SPS) with advanced predictive Control technology to render a versatile and accurate track-keeping autopilot. ASAS allows, for the first time, ship autopiloting in confined waterways since it is capable of maintaing a ship within a few meters from a pre-set track.

According to the invention there is provided a method of navigation control for a vessel comprising the steps of:
(a) providing a correlation processor for determining according to a non-linear correlation a set of predictions of vessel motion based on a set of sensory input values;
(b) determining from the predictions and from actual vessel motion a control law of ship motion;
(c) using the control law, forming a predictive controller for providing a control signal indicative of navigation control; and,
(d) at intervals updating the predictive controller based on another control law formed according to step (b).

DETAILED DESCRIPTION OF THE INVENTION

For use in restricted waterways, an automated navigation system should be capable of following a predetermined trajectory with minimal tracking error by processing a series of inputs, formulating a control solution and subsequently changing a ship's rudder angle and consequently a ship heading, so as to minimize the error between the ship's actual position and its pre-defined reference trajectory. Preferably, such a system incorporates advanced predictive control technology capable of rendering a more versatile and accurate track keeping autopilot. In this vein, the present invention greatly assists in navigating a vessel with a higher degree of safety in enclosed and in heavy traffic waters. Accurate track maintenance also results in significant fuel savings, as the vessel maintains straight-line tracks, instead of continually drifting off course and regaining track.

Figure 1:
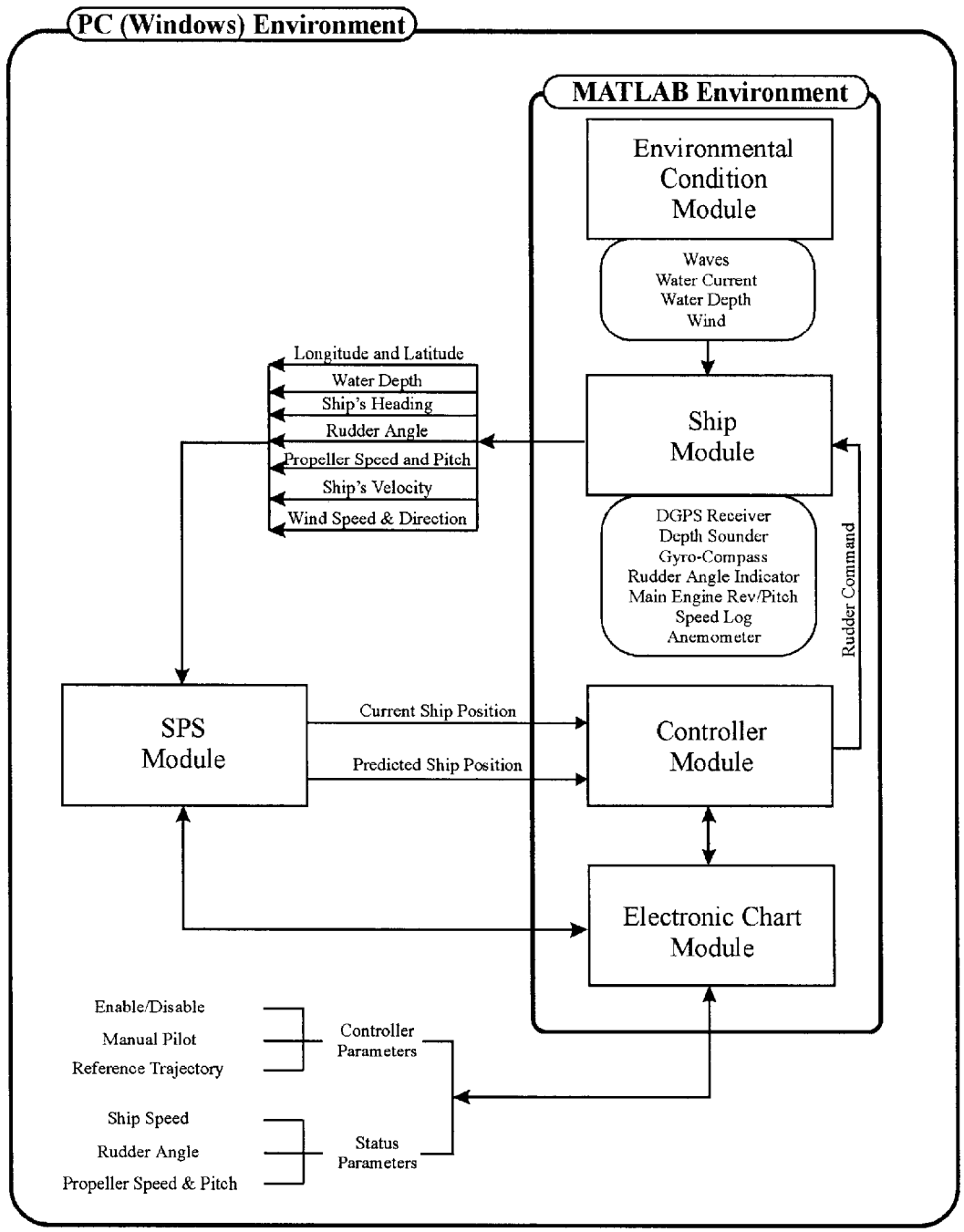
FIG. 1 is a simplified diagram of a conceptual layout for a system according to the invention.

An embodiment of the invention will now be described with reference to FIG. 1. The system comprises two main modules: a trajectory prediction module and a Modified Generalized Predictive Controller (MGPC) module, which is capable of ascertaining the current performance state of the vessel and commanding changes to the control settings to obtain the best possible performance.

Ship Predictor System

The predictive component of the ship predictor system (SPS) is based on an innovative adaptive model that has been designed to provide real-time, high-precision predictions of a vessel's position and heading. The predictor combines a mathematical model with an adaptive neural network module giving the predictor three unique features—an ability to predict vessel trajectory with unprecedented accuracy; an ability to significantly reduce costs by eliminating the need for expensive model testing or field trials to determine performance characteristics; and an ability to fine-tune predictor system parameters, in real-time, in order to optimize predictions. More detailed information on an SPS system is available in the document entitled *Development and Field Testing of a Neural Network—Ship Predictor System* (SPS) TP13368E incorporated herein by reference.

The predictive component of the system, in the context of the SPS, underwent successful field testing onboard the Canada Steamship Lines vessel M/V Nanticoke during routine operations in the St. Lawrence Seaway and the Great Lakes.

Figure 2:
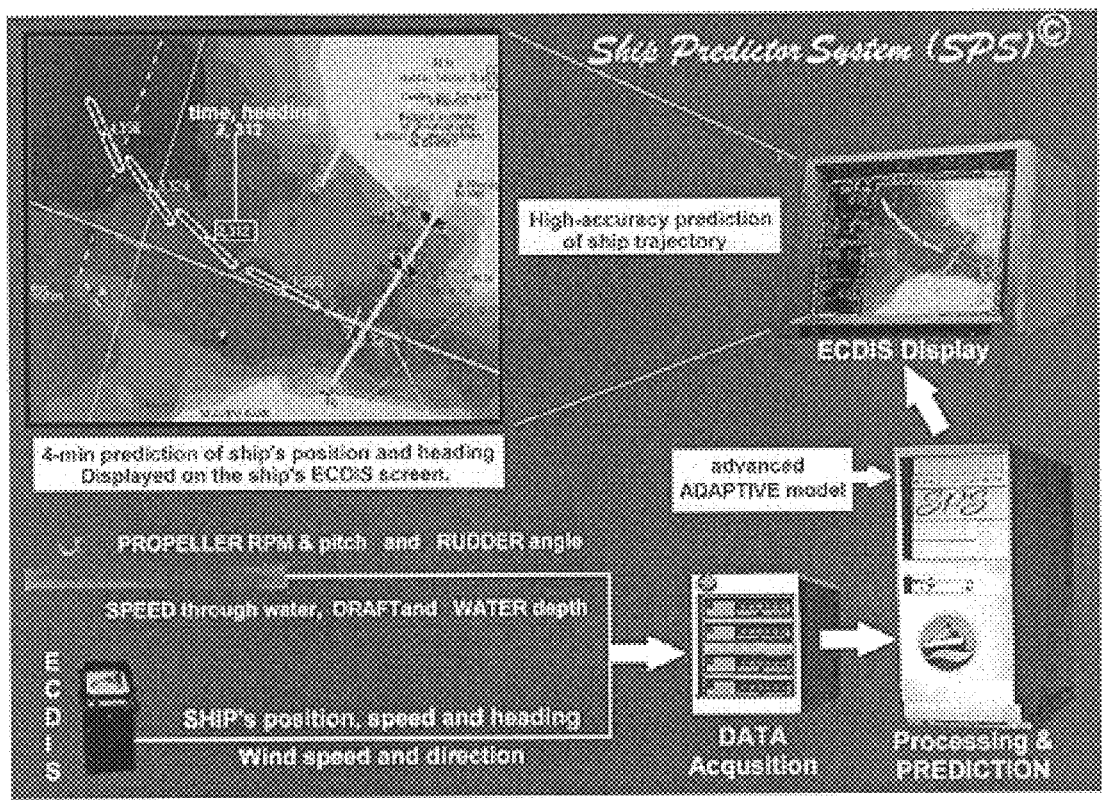
FIG. 2 is a simplified diagram of a Ship Predictor System.
Figure 3:
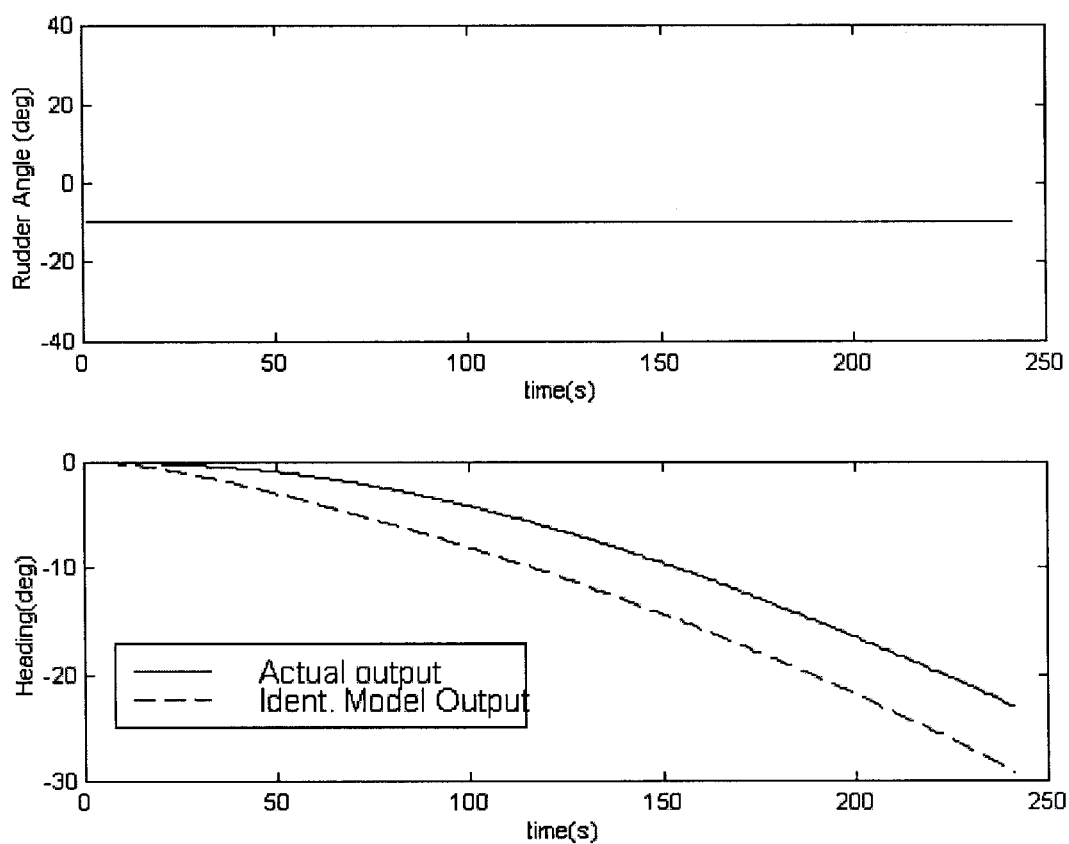
FIG. 3 is a graph of I/O data and trajectory using identified model. (constant u(t))
Figure 4:
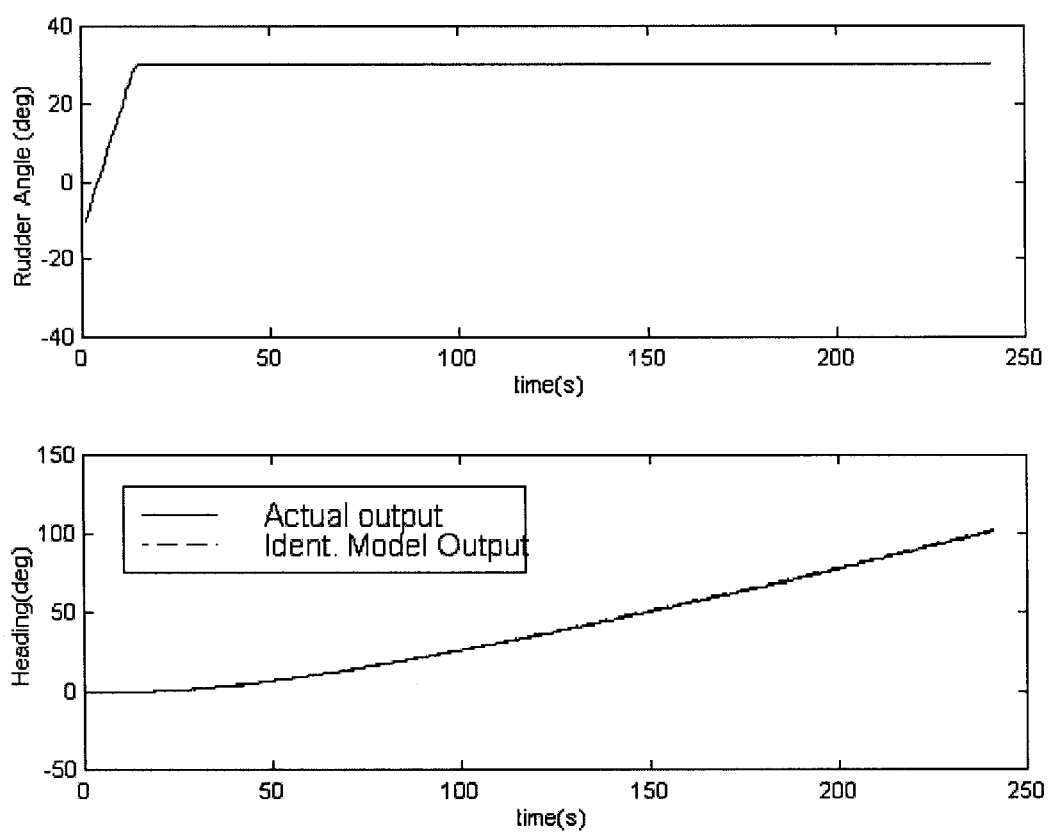
FIG. 4 is a graph of I/O data and trajectory using identified model. (step u(t))
Figure 5:
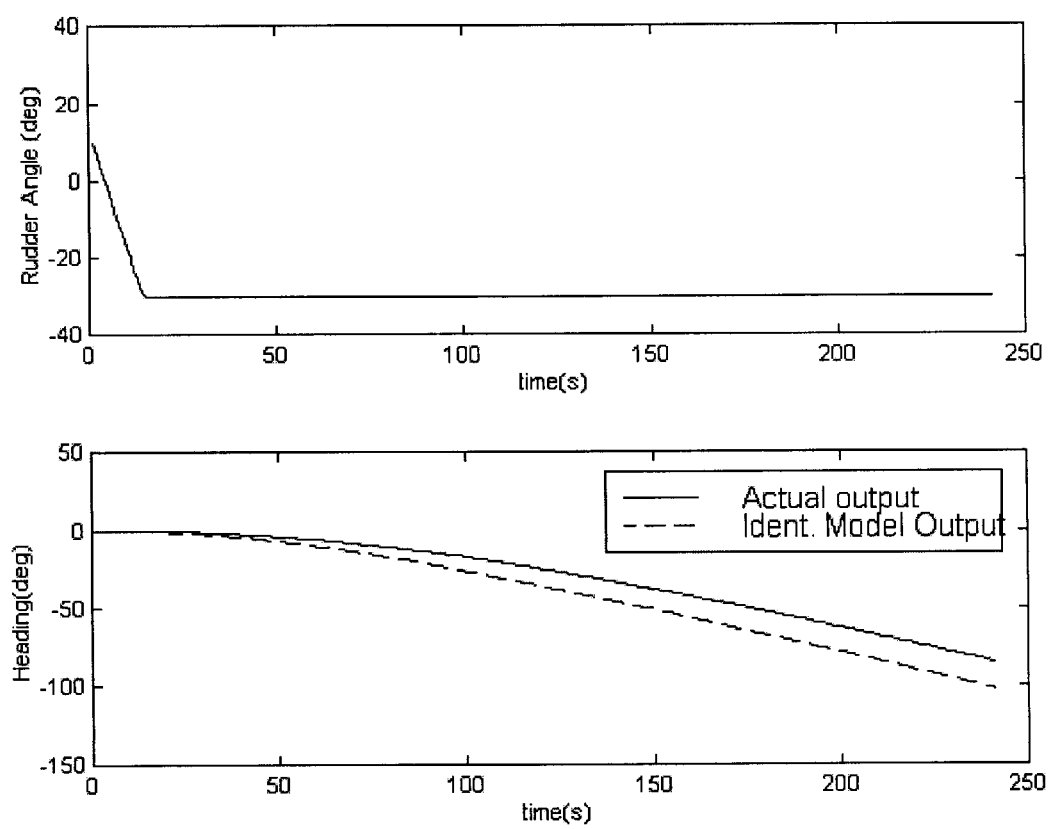
FIG. 5 is a graph of I/O data and trajectory using identified model. (changed u(t))

The SPS comprises three main components namely Data acquisition, Prediction and Display. FIG. 2 presents a schematic of SPS components. The SPS software components including data acquisition software, processing module software and the SPS predictor software were designed to execute on a single Pentium computer. This allows for inexpensive implementation of the system. It is also possible to implement the SPS in hardware and/or for execution on several computer systems or processors in parallel.

The SPS utilizes the following parameters as input values to the system:

Vessel's position and speed determined from a global positioning system;

Heading sensed from ship's Gyro;

Wind speed and direction as sensed;

Vessel's speed through water as determined from a speed log;

Propellers pitch and shaft RPM;

Rudder angle as sensed by a Helm indicator; and,

Water depth as determined by a Depth Sounder.

The data acquisition system measures the values of the above parameters from sensors in the form of indicated ship devices and then processes this data to provide required input data for the predictive model. Data pertaining to the ship's speed and heading are further processed to provide additional input data in the form of surge, sway and yaw rates of the ship.

The predictive component of the SPS is based on an innovative adaptive model designed to provide real-time, high-precision prediction of the vessel's position and heading. The predictor combines a mathematical ship-maneuvering model with a neural network module. This hybrid design allows accurate prediction in the absence of an expensive model test or additional field trials to determine a ship's hydrodynamic parameters. The use of a correlation processor to aid in the prediction process renders the prediction process non-linear.

The neural network module (NNM) provides the predictor with the ability to fine-tune its parameters, during use and in real-time, and to account for factors that cannot easily be modeled mathematically. These factors include variations in ship hydrodynamics due to changes in ambient conditions such as topography and water depth. The result is an adaptive model that combines accuracy, versatility and affordability.

The prediction period and update interval of the system are configurable. The SPS was designed to provide two-minute predictions of ship position, speed and heading, updated every second in order to meet typical control requirements. The SPS monitors the accuracy of its predictions by comparing the current position of the ship with the predicted position in hin-cast mode. Thus, the system as implemented provides inexpensive prediction with reasonable accuracy in a fashion that is tunable as necessary.

Preferably, SPS prediction data in the form of ship position, velocity and heading are displayed as a layer on the ship's Electronic Chart Display and Information System (ECDIS). The output predictions of the SPS are broadcast as NMEA strings similar to those of the DGPS, thereby making the SPS compatible with existing ECDIS systems. Of course, when a display is not desired, it is not necessary. Also, different displays may also be used and, most importantly, inventive features of the technology do not rely on backward compatibility of displays.

Controller Development

The second major component of the system is a control module. This module or controller utilizes the SPS as the model of the ship's steering dynamics along with the predicted trajectory for determining whether a change in rudder angle is required to effect a change in the ship's course. In addition to determining whether a course correction is necessary, the controller also incorporates intelligence that determines required changes in ship control settings in order for it to maintain its intended track.

A GPC controller was designed to control the yaw dynamics of the ship for a specific set of operational conditions to prove the effectiveness and implementation of the GPC technique. Subsequently, the GPC algorithm was sufficiently modified to allow it to accommodate a more sophisticated prediction capability over a wider range of operating conditions, typical of what a ship may encounter when in service. Several new concepts were introduced to handle the variety of situations that surfaced. Subsequent sections will explore these concepts in greater detail.

GPC Via Model Identification

GPC is one of the most generic control techniques in the family of model-based predictive control strategies. These techniques rely heavily on the accuracy of a model of the process being controlled, that is, the model of the plant is required to formulate the predictor and thus the predictive control law. Since the SPS provides accurate predictions of the ship's motion, it is reasonable to use the SPS as the model in the formulation of the control law. Unfortunately, as noted above, the SPS is non-linear and can therefore not be used with a typical GPC.

As mentioned earlier, the SPS is comprised of a mathematical component and a correlation processor component in the form of a neural network (NN) component. It would be relatively straightforward to embed the mathematical component of the SPS into the control law given that it is linear. However, it is more difficult to utilize the NN component using the theoretical framework. If the contribution of the NN to the overall predicted solution were small, it would seem appropriate to embed only the mathematical relation into the control algorithm and account for the NN component through careful selection of the $T(q^{-1})$ polynomial, the specifics of which can be set to achieve closed loop robustness. This is not the case as quite often the NN makes a very significant contribution to the SPS solution and thus, embedding only the mathematical component of the SPS into the control law is insufficient.

In order to use a GPC, it would be useful to fit the dynamics of the SPS to a linear time invariant (LTI) model, which would subsequently be used to develop the control law. Two techniques were targeted to achieve this—system identification and recursive parameter identification. In all cases, these techniques were applied to develop LTI or Linear Time Varying (LTV) models of the yaw dynamics of the SPS. This way, the error definition was straightforward and the forward kinematics could be ignored.

System Identification Approach

System identification involves the formulation of a model using measured input/output data collected from a process. Common approaches involve the use of parametric techniques, wherein a user specifies the structure of the model. The model parameters are adjusted until the model output matches the measured output as closely as possible. Other options include correlation analysis techniques, which estimate the impulse or step responses of the process, and spectral analysis techniques, which are used to estimate the process frequency response. Since a mathematical model of the process is required to formulate the GPC law, only parametric model estimation techniques were utilized. The system identification toolbox in Matlab™ was used extensively to formulate the models.

The aim of this approach was to identify a model of the SPS by finding the model parameters that minimize the error between the input/output data and the response of the process model. From the generic model format for use with a GPC given by, $$A(q^{-1})y(t) = \frac{B(q^{-1})}{F(q^{-1})}u(t-n_k) + \frac{C(q^{-1})}{D(q^{-1})}e(t), \quad (1.1)$$

many of the most popular parametric identification techniques (ARX, ARMAX, Output Error, Box-Jenkins) can be derived. To implement these techniques, the user need only select the orders of the polynomials in (1.1) and provide a set of input/output data.

Several model structures were examined and all rendered models were found to be poor representations of the SPS. Considering the dependence of the GPC algorithm on model accuracy, it was concluded that a LTI model estimated using system identification techniques would not render a suitable model for tracking controller design activities.

Recursive Identification Approach

Recursive identification involves the online estimation of the parameters of a plant model. Assuming a process with dynamics that are characterized by a linear model of the form, $$y(t) = \phi(t-1)^T \theta \quad (1.2)$$

where $\phi(t-1)$ is a vector containing past values of the output y and the input u, $\theta$ is a vector containing coefficients that weight the inputs and outputs, and $^T$ denotes the transpose of a matrix, it is possible to estimate parameters. Whereas system identification techniques fit a model to a collected set of static data, the goal of recursive identification is to recursively estimate the individual parameters contained in the vector $\theta$ on-line. The result is a potentially time varying linear model which may be more accurate than a LTI model generated using system identification techniques. One of the more popular recursive identification techniques is the Least Squares Algorithm (LSA).

The recursive parameter estimate relation is derived from the minimization of a quadratic cost function formulated in terms of the error between a new data point and the estimation of that data point calculated using equation (1.2):

$$\hat{\theta}(t) = \hat{\theta}(t-1) + \qquad (1.3)$$
$$\frac{P(t-2)\phi(t-1)}{1+\phi(t-1)^T P(t-2)\phi(t-1)} \left[ y(t) - \phi(t-1)^T \hat{\theta}(t-1) \right] \text{ where,}$$

$$P(t-1) = P(t-2) - \frac{P(t-2)\phi(t-1)\phi(t-1)^T P(t-2)}{1+\phi(t-1)^T P(t-2)\phi(t-1)}, \qquad (1.4)$$

$\hat{\theta}(\cdot)$ denotes the estimate of the actual parameter vector, and y(t) is the current measured output. The components of equation (1.3) are intuitive. The expression in square brackets is simply the error between the actual output and the model output. Thus, the new parametric estimate is the previous value adjusted by the current error multiplied by a gain or forgetting factor. In addition, P(t−1) is the covariance matrix, which is non-increasing in nature. Thus, the LSA has the potential to converge quickly if the data is sufficiently exciting. However, for time-varying systems, the non-increasing nature of P(t−1) can cause the gain of the estimator to become small quickly, thereby potentially inducing slower parameter convergence. This can be rectified for time-varying systems by implementing a technique known as covariance resetting. Simply stated, at regular time intervals $\{t_1\}$, the matrix P is reset to a higher gain value. In this case, (1.4) becomes, $$P(t-1) = \begin{cases} P(t-2) - \frac{P(t-2)\phi(t-1)\phi(t-1)^T P(t-2)}{1+\phi(t-1)^T P(t-2)\phi(t-1)}, & t \notin \{t_i\} \\ k_i I, & t \in \{t_i\} \end{cases} \qquad (1.5)$$

Using the recursive identification technique, the user must first specify the details of the structure of the model given in equation (1.2). At each new data point, the estimate of the model parameters, $\hat{\theta}(t)$, is updated thereby forming a new model of the process. This model, provided in a suitable form, is acceptable for use in the development of the GPC law.

There are several options available for application of these techniques to identify a model for use in design of the GPC. The following approaches were attempted:

Use of current and past data to formulate the model (on-line identification);

Use of the predicted data to formulate the model (off-line identification);

Use of the steady-state values of the parameter estimates; and

Use of the average values of the parameter estimates.

Figure 6:
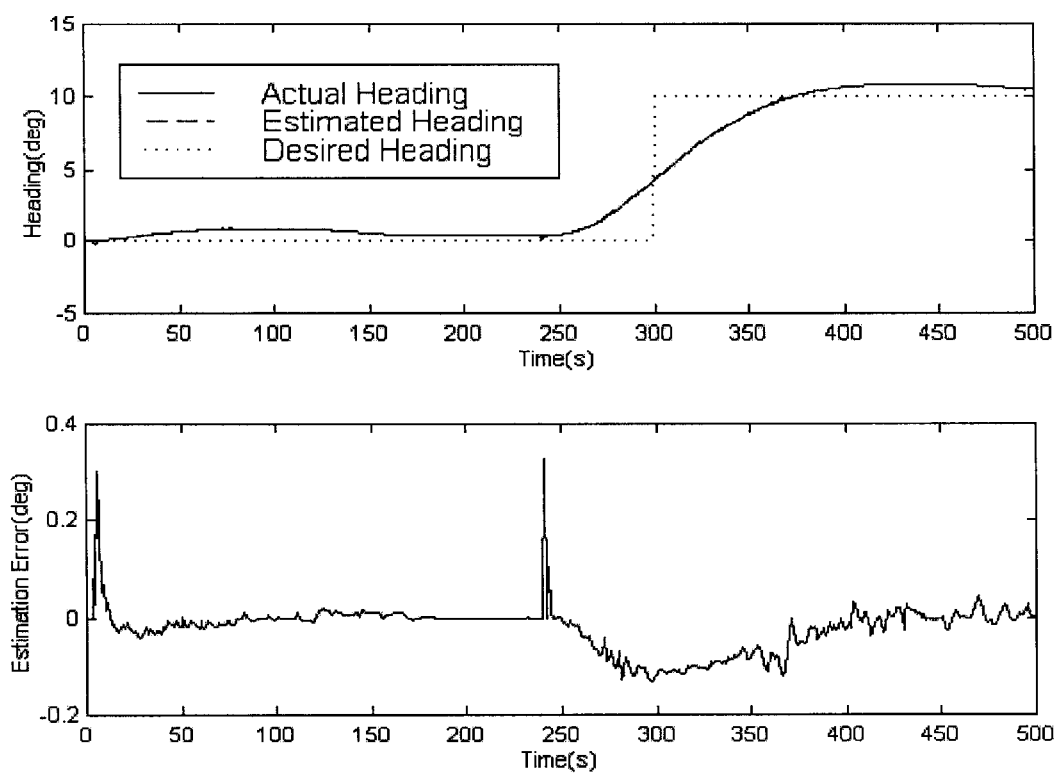
FIG. 6 is a graph of Identified model output, actual yaw trajectory, and estimation error.
Figure 7:
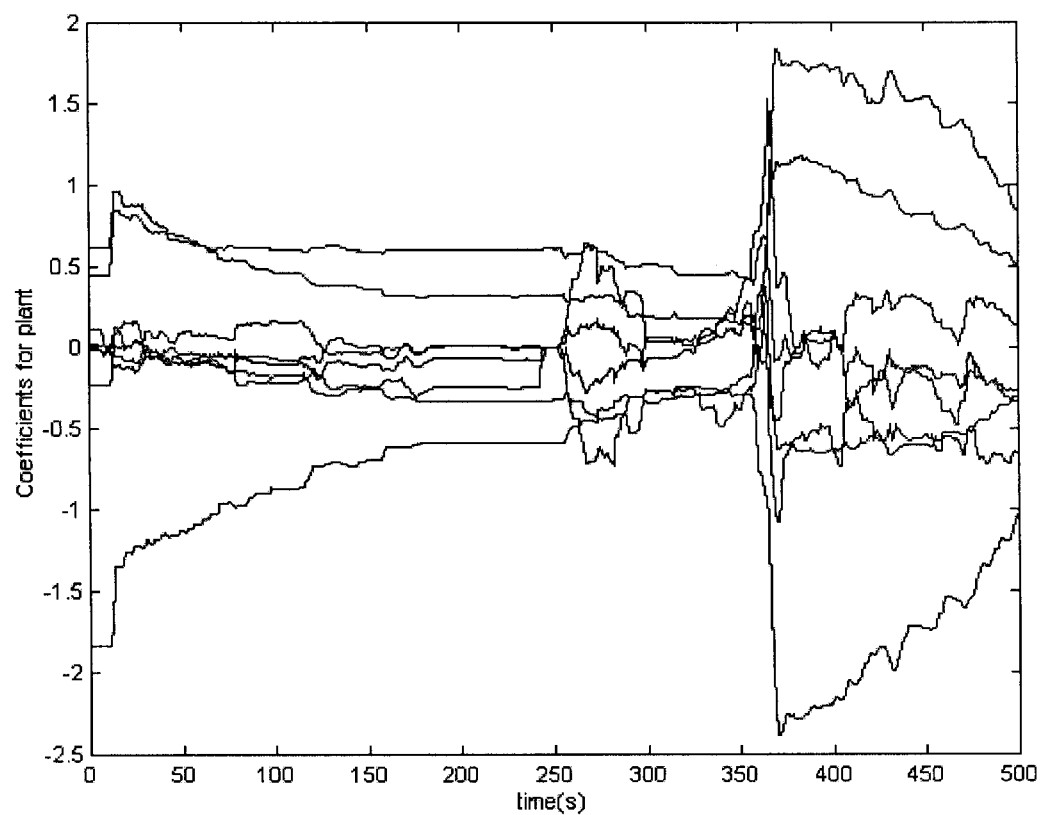
FIG. 7 is a graph of time history of parameters of identified model.
Figure 8:
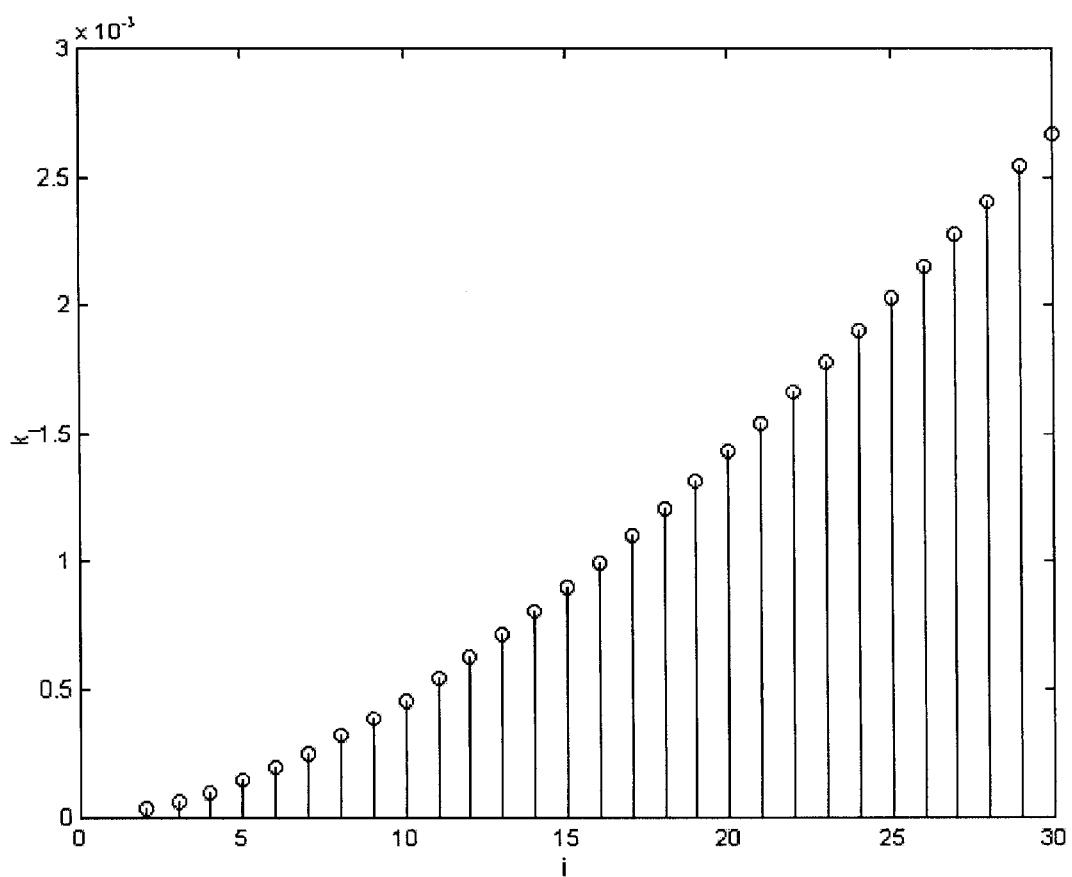
FIG. 8 is a graph of GPC controller gain.

FIG. 6 and FIG. 7 illustrate the results of the on-line identification studies. In all cases, the yaw dynamics of the ship were identified and a GPC course-keeping controller was designed. The first attempt involved the use of current and past data to formulate the model. FIG. 6 shows a plot the estimated model output $\phi(t)^T\hat{\theta}(t)$, the actual output y(t), and the desired heading. Since the estimated output and the actual output are so close, a plot of the estimation error $y(t)-\phi(t)^T\hat{\theta}(t)$ is also provided. FIG. 7 shows the time histories of the model parameters $\hat{\theta}(t)$. It is apparent from FIG. 6 that the model is a very good fit to the data, and that the GPC controller operates relatively well.

The one major drawback of this controller is the overshoot observed in the response. The GPC parameters were varied in attempts to eliminate the excessive overshoot but to no avail. The LSA estimator parameters were also adjusted in attempts to improve the response. This.also failed to reduce the overshoot. This result is not entirely unexpected since for long costing horizons, the estimated linear model becomes a poorer representation of the SPS model. Hence the GPC does not behave as expected, and in fact, for large enough horizons, the closed loop system becomes unstable. Secondly, this approach did not fully utilize the predictive capability of the SPS.

In an attempt to improve the system performance, recursive identification techniques were applied to the predicted data that is generated by the SPS (off-line identification). Now, given that the parameter identification has been performed off-line, the method of recasting the identified model into a GPC compliant model is not obvious. Two recasting techniques were investigated. In both techniques, at every time step t, the SPS was used to generate an input and output sequence, u(t+i) and y(t+i), i=0, . . . , $N_2$.

In the first recasting technique, the recursive LSA estimator was applied input/output sequence to estimate the model parameters $\hat{\theta}(t+i)$, for i=0, . . . , $N_2$. For the inputs sequences that were tried, the estimates tended towards a steady state value as i approached $N_2$, so the parameter estimate $\hat{\theta}(t+N_2)$ was used to obtain the parameters of the identified model, and in turn the GPC control law.

In the second recasting technique, the recursive LSA estimator was again applied input/output sequence to estimate the model parameters $\hat{\theta}(t+i)$, for i=0, . . . , $N_2$. However, instead of using the steady state value for the model parameters, an average $$\theta_{avg} := \frac{1}{N_2} \sum_{i=0}^{N_2} \hat{\theta}(t+i)$$

was used to obtain the parameters of the identified model, and in turn the GPC control law. Unfortunately, both recasting techniques did not result in better responses.

It was concluded that recursively identifying a plant model for use in the development of a GPC controller was not feasible. It was reasoned that the identified model was developed for a specific set of input/output data, which results in a model that is not a good representation of the plant dynamics when a different input profile is applied. Furthermore, these techniques do not fully utilize the predictive capabilities of the SPS.

Heuristic Approach

Given the lack of success with identifying a model for use in developing a GPC track-keeping controller, a heuristic approach was adopted.

It is known that the GPC structure fits the framework of the problem at hand. It was first observed that the GPC control law was always of the form $$\Delta \hat{u}(t) = K\hat{e}(t) \tag{1.6}$$

where, $$K = (G^T \Gamma G + \Lambda)^{-1} G^T \Gamma$$

$$= [k_{N_1} \quad k_{N_1+1} \quad \ldots \quad k_{N_1-1} \quad k_{N_2}]$$

$$\hat{e}(t) = (\hat{p}(t) - \hat{r}(t))$$

$$= [e(t+N_1) \quad e(t+N_1+1) \quad \ldots \quad e(t+N_2-1) \quad (e(t+N_2)])^T.$$

Figure 9:
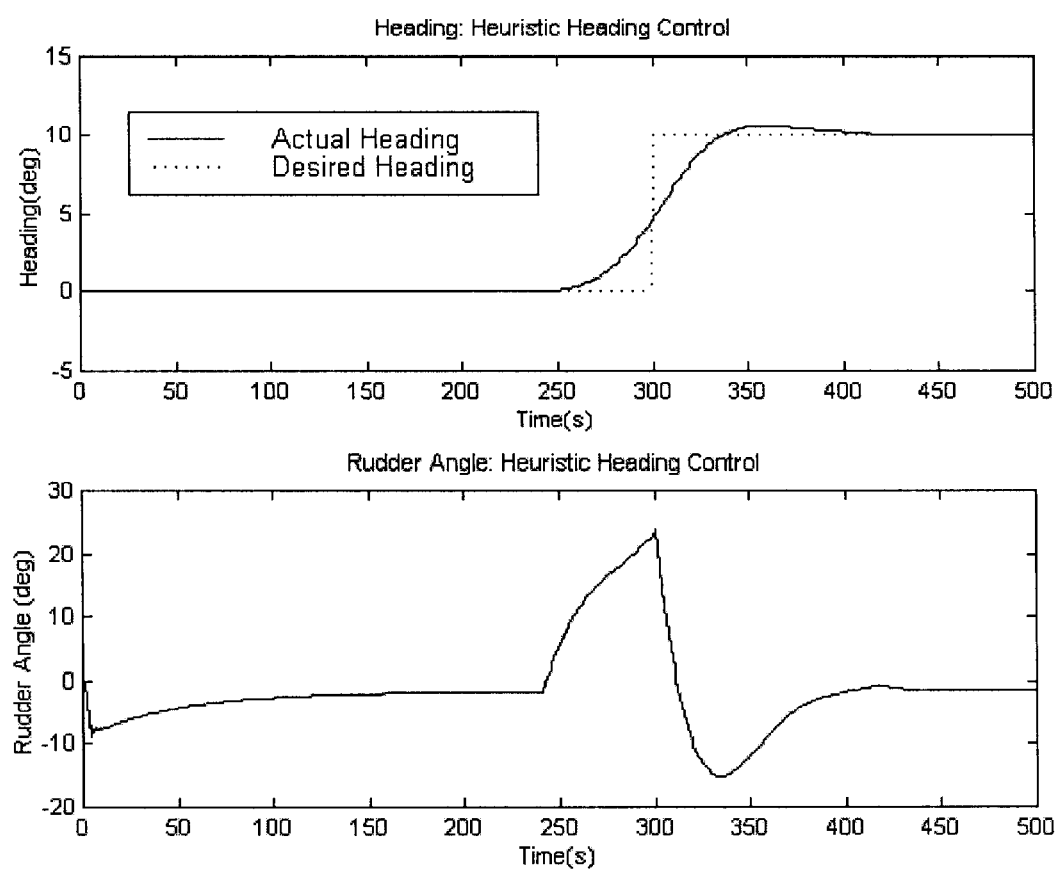
FIG. 9 is a graph of closed loop response, Heuristic approach to GPC heading control.

Using the classical GPC implementation, previous investigations into course keeping control showed that the gains in K typically exhibited an exponential behavior. It was hypothesized that if K was assumed to have the form $$K = K_p[\alpha^N \alpha^{N-1} \ldots \alpha^1 \alpha^0], \tag{1.7}$$

then by tuning $K_p$ and $\alpha$, perhaps a better response would be obtained. In fact, the simulation results illustrated in FIG. 9 show that with $K_p$=0.015, $\alpha$=1.02,

N=60, the response of the heading controller that was based on recursive identification of the SPS model is improved. (i.e. compare FIG. 9 to FIG. 6).

Figure 10:
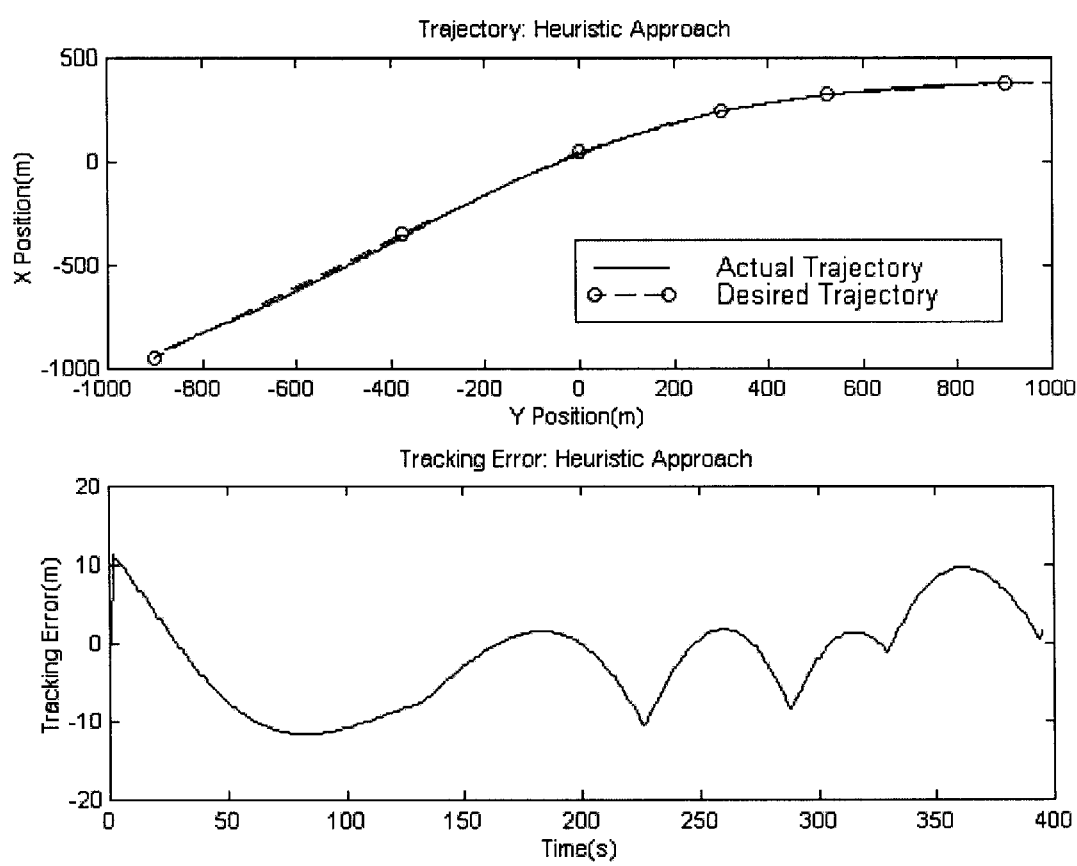
FIG. 10 is a graph of closed loop response, Heuristic approach to GPC tracking control.

Motivated by these results, a track-keeping control strategy was formulated such that K was assumed to be of the form (1.7), and the error e(t+i) was defined as the difference between the desired heading and the predicted headings. With $K_p$=0.0003, $\alpha$=1.0375,

N=100, it was found that the resulting controller was vastly superior to the simulated performance of a conventional track keeping controller which is derived by introducing kinematics and a Proportional-Integral (PI) control loop to an existing course keeping autopilot. FIG. 10 shows a plot of the closed loop response and the tracking error of the ship.

Given that the controller gains were chosen heuristically, the controller functions remarkably well compared to the conventional track-keeping controller. To gain more insight into the controller, a brief parametric study was conducted. The results are as follows:

With a constant value of $\alpha$, there appears to be a specific and well-defined value of $K_p$ that minimizes the overshoot of the response to a step input seemingly indicating that an optimal solution exists;

The response was sensitive to the value of $\alpha$. A value of $\alpha$=1.0375 rendered the best response. Values of $\alpha$ that were greater than 1.20 or less than 0.8 produced very poor/unstable responses;

The value of $N_2$ with $N_1$=0 had a large effect on the overshoot of the system. As expected, the larger values of $N_2$ resulted in less overshoot, but poorer tracking. Setting $N_2$=100 produced acceptable results.

A time varying gain approach to the choice of K was also devised. Suppose that a nominal value for the GPC gain $$\overline{K} := [\overline{k}_{N_1} \ldots \overline{k}N_2]$$

has been defined so that $\Delta\hat{u}(t) = \overline{K}\hat{e}(t)$ results in acceptable performance. Now suppose each gain, $k_i$, is updated using the recursive relation $$k_i(t+1) = \overline{k}_i + \eta|e(t+i)|, \quad \eta > 0.$$

Figure 11:
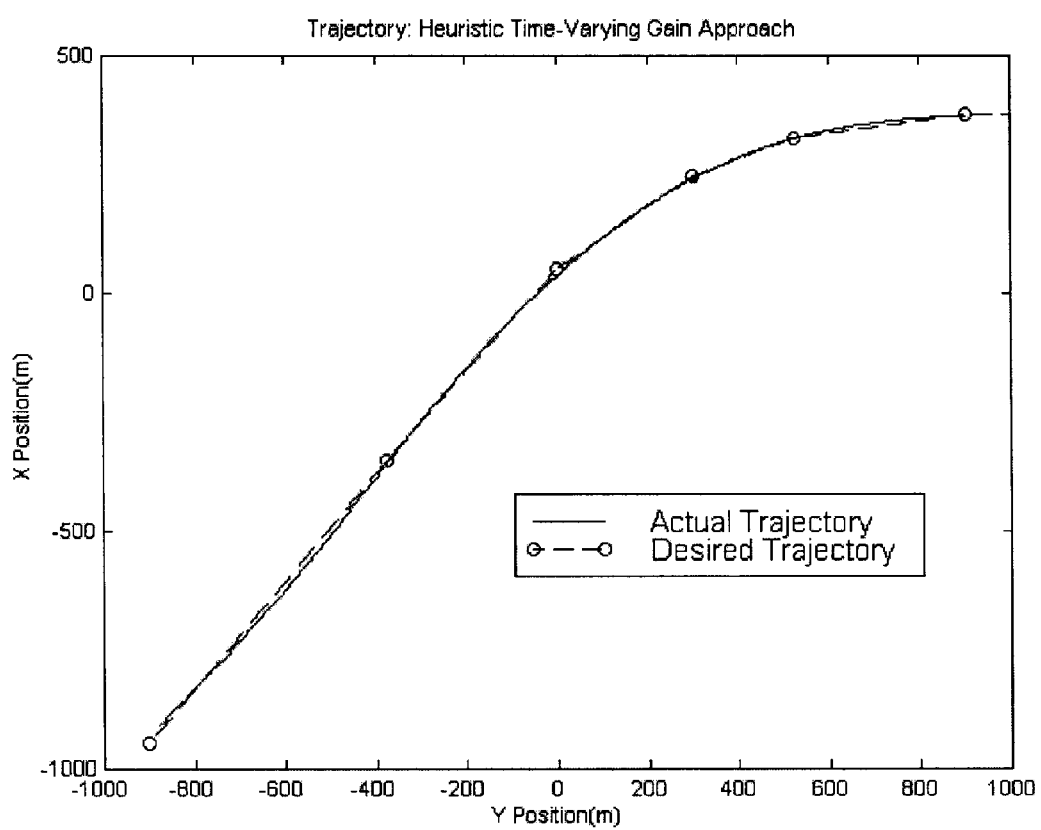
FIG. 11 is a graph of closed loop response, Heuristic Time-Varying Gain Approach.
Figure 12:
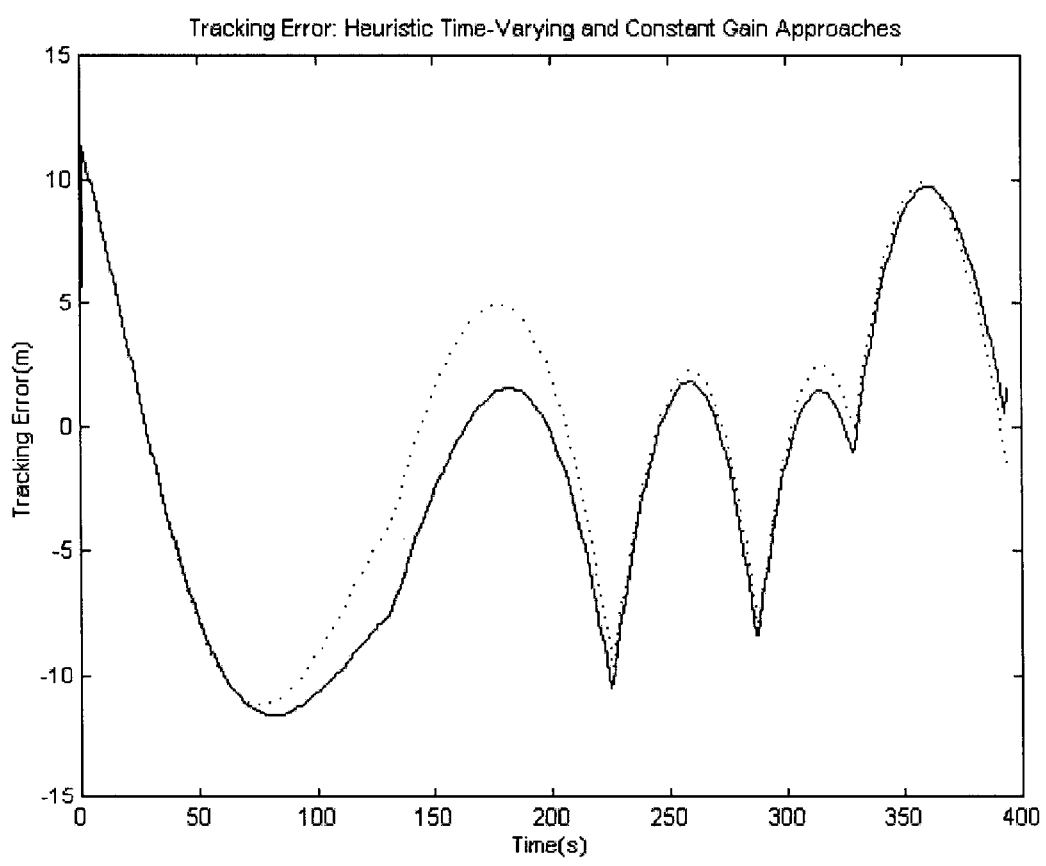
FIG. 12 is a graph of comparing Heuristic Time-Varying and Constant Gain Aproaches (Tracking Error)

If the error is small, then $K(t) \approx \overline{K} \approx$ constant, and the new adaptive controller behaves like the constant gain heuristic controller discussed previously. If however, $|e(t+i)|$ is large for some i, then $k_i(t+1) > k_i(t)$. This has the effect of increasing the gain at the point in the costing horizon where the error is large. It appears that this larger gain would improve the performance of the constant gain heuristic approach. This approach was simulated for the case where $$\overline{K} := 0.0003[(1.0375)^{100} \ldots (1.0375)^0]$$

$$k_i(t+1) = \overline{k}_i + 0.0025|e(t+i)|$$

and the closed loop response is illustrated in FIG. 11. Note that the $\overline{K}$ used here is the constant gain matrix used in the constant gain controller simulation discussed previously. FIG. 12 can be used to compare the tracking error for the constant gain heuristic controller and the time-varying gain controller. When the error is small (i.e. t>225), the two control strategies are almost identical, but when the error is larger (i.e. t<225), the time-varying gain strategy attempts to force the error to zero much more quickly.

Although there was some confidence in the structure of the control gains, the single biggest drawback was the inability to rigorously define the magnitudes of the gains. Simulation results indicated that an "optimal" value of K may exist, but the difficulty was attempting to define a technique whereby the optimal gain was calculable.

Modified GPC Approach

The Modified GPC (MGPC) approach is a variation of the classical Generalized Predictive Control (GPC) algorithm. The classical GPC design algorithm requires a linear model of the vessel to derive the control law. Unfortunately, in order to accurately model ship navigation, a non-linear model is required including both a mathematical model, which may be linear, and a correlation processor in the form of a neural network. Thus, a prior art GPC is not capable of providing the control intelligence necessary for these types of systems. However, the classical GPC approach has many proven capabilities, which are relevant to the current system under study.

The optimal classical GPC control law is as follows:

$$\hat{e}(t) := \hat{p}(t) - \hat{r}(t), \qquad (1.8)$$

$$K := (G^T \Gamma G + \Lambda)^{-1} G^T \Gamma$$

$$\Delta\hat{u}(t) := K\hat{e}(t).$$

Note also that G is a matrix of step response coefficients with the form, $$G := \begin{bmatrix} g_0 & 0 & 0 & \cdots & 0 \\ g_1 & g_0 & & & \vdots \\ g_2 & g_1 & \ddots & & g_0 \\ \vdots & \vdots & & \ddots & \vdots \\ g_{N_1-1} & g_{N_2-2} & g_{N_2-3} & \cdots & g_{N_2-N_0} \end{bmatrix} \qquad (1.9)$$

where $N_1 = 0$ without loss of generality. In order to implement a MGPC solution, the parameters in equation (1.8) needed definition, namely the GPC gain vector K and the error vector $\hat{e}(t)$. These quantities can easily be determined if the vector $\hat{p}(t)$ of free response coefficients and the matrix G of step response coefficients is known.

By adapting the GPC framework to accommodate an external predictor, the following desirable qualities can be realized:

Inherent adaptive mechanism to accommodate different ship models;
  Utilizes all of the knowledge of the SPS to formulate the control law;
  Straight forward to implement; and,
  Have many design parameters associated with GPC to utilize.

The elements of equation (1.9) can readily be obtained from a step response test (i.e. change from rudder angle of 0° to a rudder angle of 1° in one time step) using the SPS. Moreover, the dead time can be defined by examining the zero entries of the step response after the step has been applied. Given that no benefit prevails from setting $N_1$ to fall within the dead time, identification of the length of the dead band makes the selection of $N_1$ obvious and easy to implement automatically.

When the disturbed SPS model was used to generate the step response coefficients, the resulting controller performed poorly. To avoid this, the step response test was performed on the nominal SPS model (i.e. output weights of the neural net set to zero) and the performance of the GPC improved dramatically. For example, suppose the GPC parameters are chosen to be $N_1 = 23$, $N_2 = 123$, $N_u = 0$ (delay=22, horizon=100),
  $\gamma_i = (0.9)^i$, $i = N_1, \ldots, N_2$,
  $\lambda_0 = 0.05$.

Figure 13:
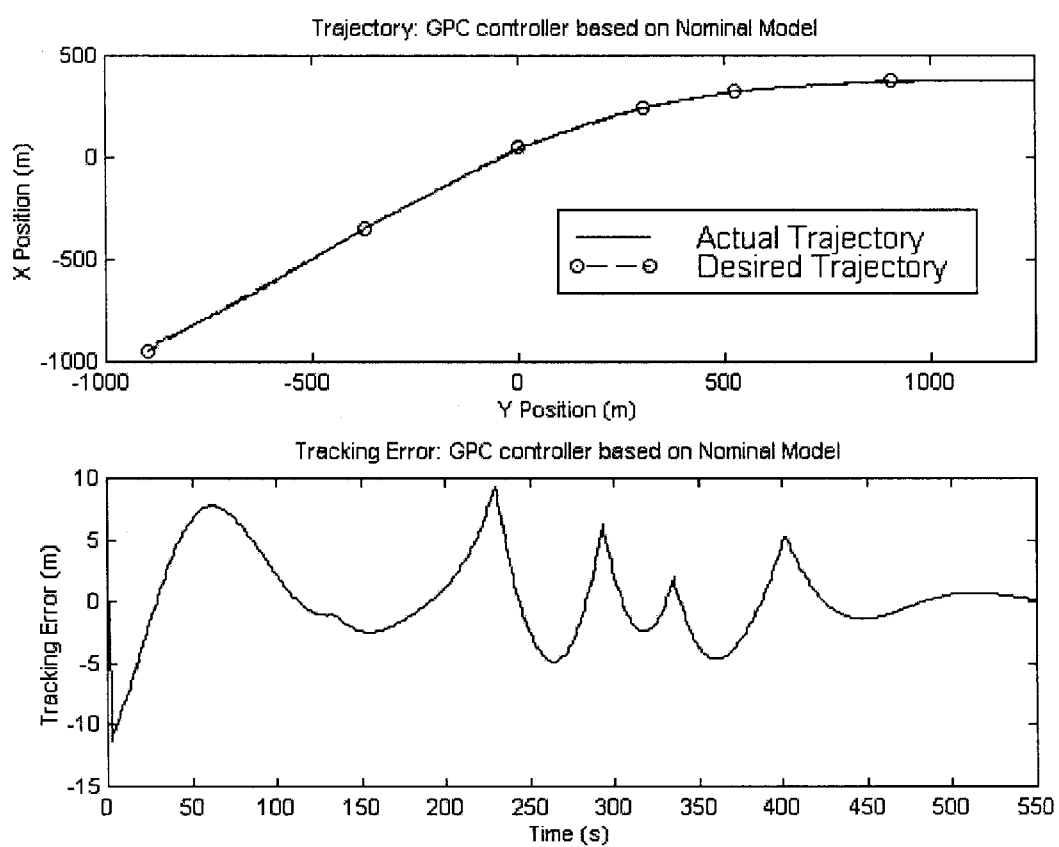
FIG. 13 is a graph of closed loop response, MGPC using nominal SPS model.
Figure 14:
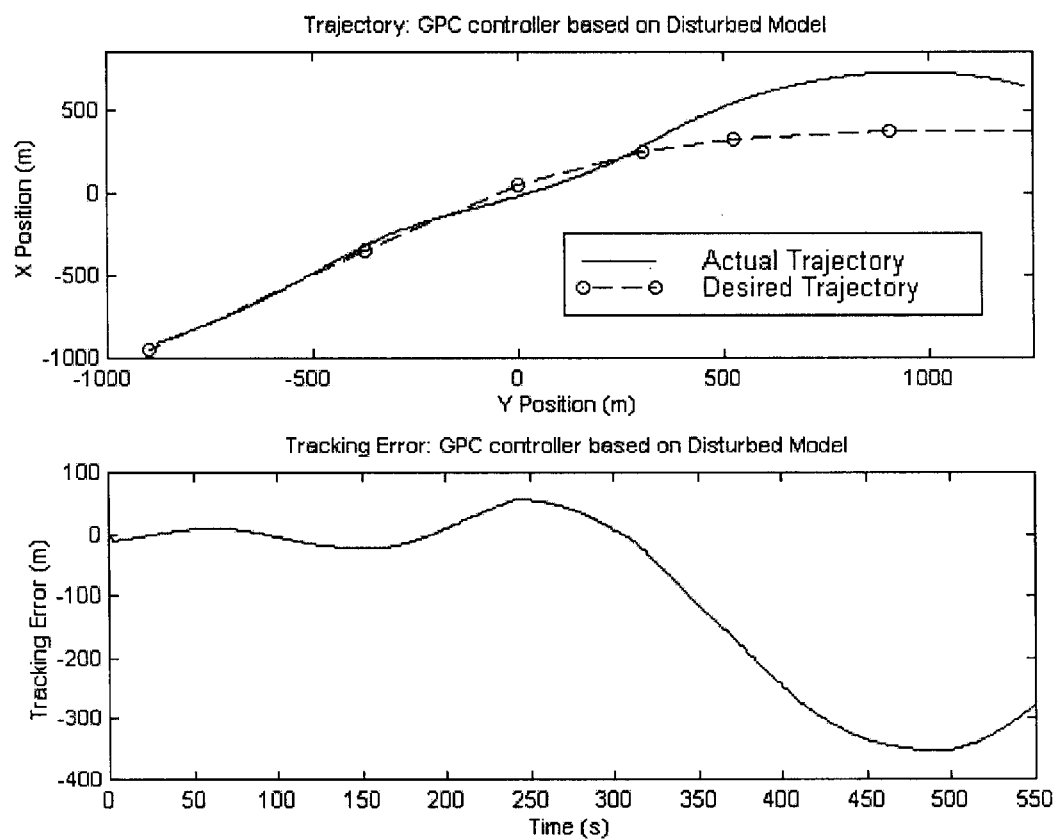
FIG. 14 is a graph of closed loop response, MGPC using disturbed SPS model;.

FIG. 13 shows the controlled response of the ship when the nominal model is used to obtain the matrix G, and FIG. 14 shows the controlled response of the ship when the perturbed model is used to obtain the matrix G. Clearly, the controller derived using the nominal model resulted in superior performance.

By definition, $\hat{p}(t)$ is the response of the plant given that the control input is held constant at the value it assumed at the current time t. In the literature, this is often referred to as the free response. Note that this is exactly the information that the SPS provides. That is, the prediction generated by the SPS assumes that the rudder angle is held constant for the duration of the prediction provided that a slew rate limitation has not been invoked. Thus, the formation of the free response involves, simply, generating a prediction that extends over the entire length of the prediction horizon. The appropriate sequence is extracted from the prediction for the case $N_1 \approx 0$.

Since the control objective of the MGPC is track-keeping, the free response is given in terms of the predicted position of the ship over the prediction horizon; namely, $(x_p[t+i], y_p[t+i])$ for $i = N_1, \ldots, N_2$. From the definition of track-keeping (see below), it is seen that the error vector $\hat{e}(t)$ can be calculated using these position predictions, the predicted surge/sway velocities and the desired trajectory.

If the matrix G of step response coefficients is known, then given the GPC parameters, Γ and Λ are definable and the GPC gain matrix K is determinable.

Reference Trajectory

The reference trajectory must be known a priori. The trajectory is defined using a series of way-points, the co-ordinates of which are defined with respect to the global reference frame. These way-points are joined with straight lines to form the reference trajectory. The reference trajectory is modifiable during system operation.

Tracking Error Definition

For track-keeping control, the error is a measure of how far the ship is from the desired trajectory and is defined via a Δx and Δy measure in the plane of the surface of the earth. Furthermore, the predictive control algorithms requires future values of the error defined over the prediction horizon.

Figure 16:
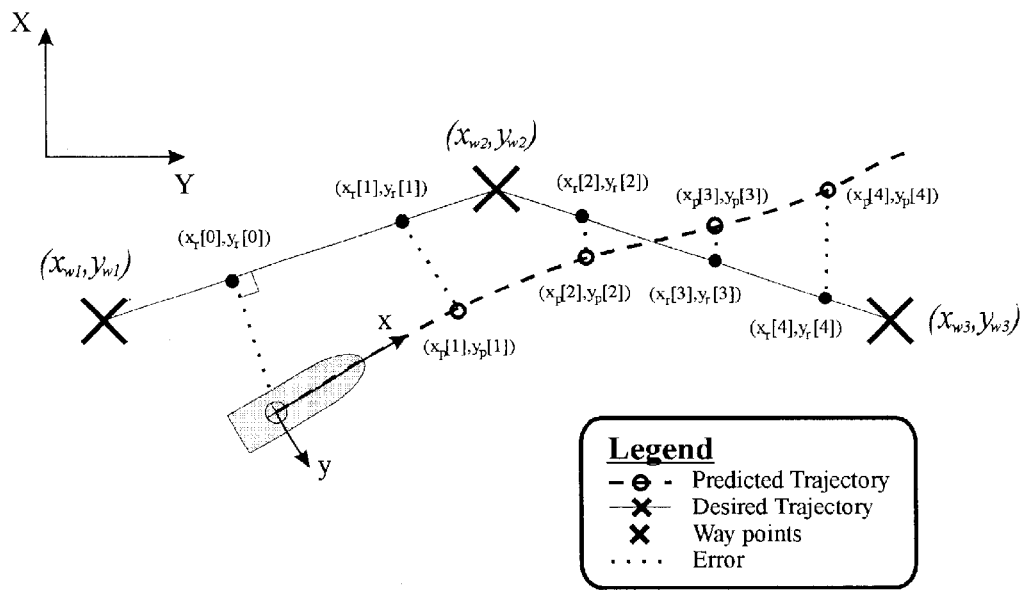
FIG. 16 is a simplified diagram relating to error definition for the ASAS GPC.

Several definitions for the error were investigated, but it was found that the following definition provided the best results. Suppose at time t=0, the ship is located at $(x_p[0], y_p[0])$, and that the desired trajectory is defined by a set of way-points $\{x_{wi}, y_{wi}, i=1, \ldots, M\}$ (See FIG. 16). To define the error e[k], for k=1, ..., $N_2$, perform the following steps:

1. Find the closest point on the desired trajectory to the current ship position $(x_p[0], y_p[0])$, and define that point as $(x_r[0], y_r[0])$. Then $|e[0]|$ is defined as the distance between $(x_p[0], y_p[0])$ and $(x_r[0], y_r[0])$. The sign of $|e[0]|$ is positive if the desired trajectory is to starboard, and negative if the desired trajectory is to port.
2. Given the predicted surge and sway velocities from the SPS $u_0[i]$, and $v_0[i]$ for i=1, ..., $N_2$, the predicted speed is defined as $U[i]:=\sqrt{u_0[i]^2+v_0[i]^2}$.
3. Given the speed U[i] and the time interval Δt, the predicted distances traveled are defined as $d[i]:=\Delta t \times U[i]$.
4. Then for i=1, ..., $N_2$, the point $(x_r[i], y_r[i])$ is found to be the point on the desired trajectory that is a distance d[i] from the point $(x_r[i-1], y_r[i-1])$.
5. Using the predicted ship trajectory $(x_p[i], y_p[i])$ provided by the SPS, the magnitude of the predicted error can then be defined as $|e[i]|:=\sqrt{(x_r[i]-x_p[i])^2+(y_r[i]-y_p[i])^2}$, and the sign of the error is taken to be positive if the desired trajectory is to starboard and is negative if the desired trajectory is to port.

Figure 17:
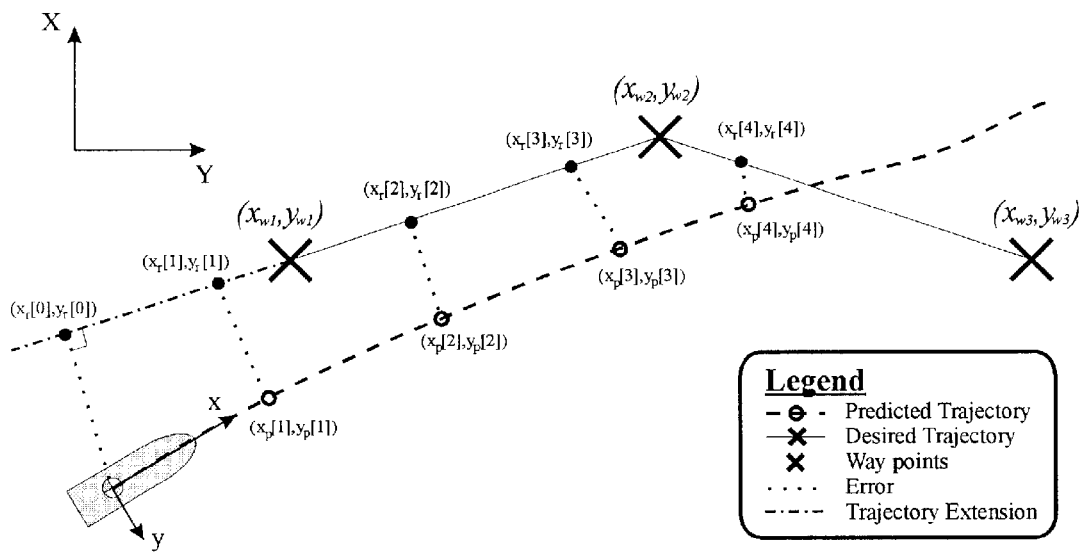
FIG. 17 is a simplified diagram relating to error definition. (ship position is before the start of the desired trajectory)

If the ship's initial position $(x_p[0], y_p[0])$ is located before the first way-point $(x_{w1}, \ldots, y_{w1})$, then a straight line is projected back beyond the first way-point and the method described above is applied. The dash-dotted line in FIG. 17 illustrates how the desired trajectory is extended.

Scenarios and Modes of Operation

One of the user-selected inputs that govern the functional operation of the autopilot is the Scenario. A scenario definition embeds desired performance characteristics within a system and thus governs selection of controller design parameters. The autopilot has been developed to accommodate any number of scenarios; however, only the "Confined Waterway" and "Open Waters" scenarios have been described below.

The Confined Waterway scenario sets the controller parameters such that accurate tracking is achieved. Rudder activity, which is directly related to operational efficiency, is of secondary importance. The Confined Waterways scenario has several modes of operation associated with it to maximize tracking performance.

The Open Waters scenario sets the controller parameters to achieve high operational efficiency. This is achieved by minimizing the amount and rate of rudder movement, which reduces drag on the rudder and reduces wear and tear to the steering gear. Using this scenario, the tracking error is of secondary performance since it is assumed that this scenario will be enabled in waters whereby accurate tracking is not essential.

Due to the conservative nature of the Open Waters scenario, only one mode of operation was required for implementation. However, within the Confined Waterways scenario, there are 4 modes of operation—cruising, turning, recovery, and abort. These modes of operation are defined using a series of quantitative switching conditions. These modes have been established to reflect the differing control requirements associated with various maneuvers (i.e. straight line trajectory, turn, etc.) all in an attempt to minimize tracking error.

The controller has been designed to automatically implement the most appropriate mode of operation for a given engagement. The rationale behind the selection of the mode of operation is contingent on the following:

Tracking error at time t;

Turning or cruising way-points; and $N_3$ turning horizon invoked or disabled.

Figure 15:
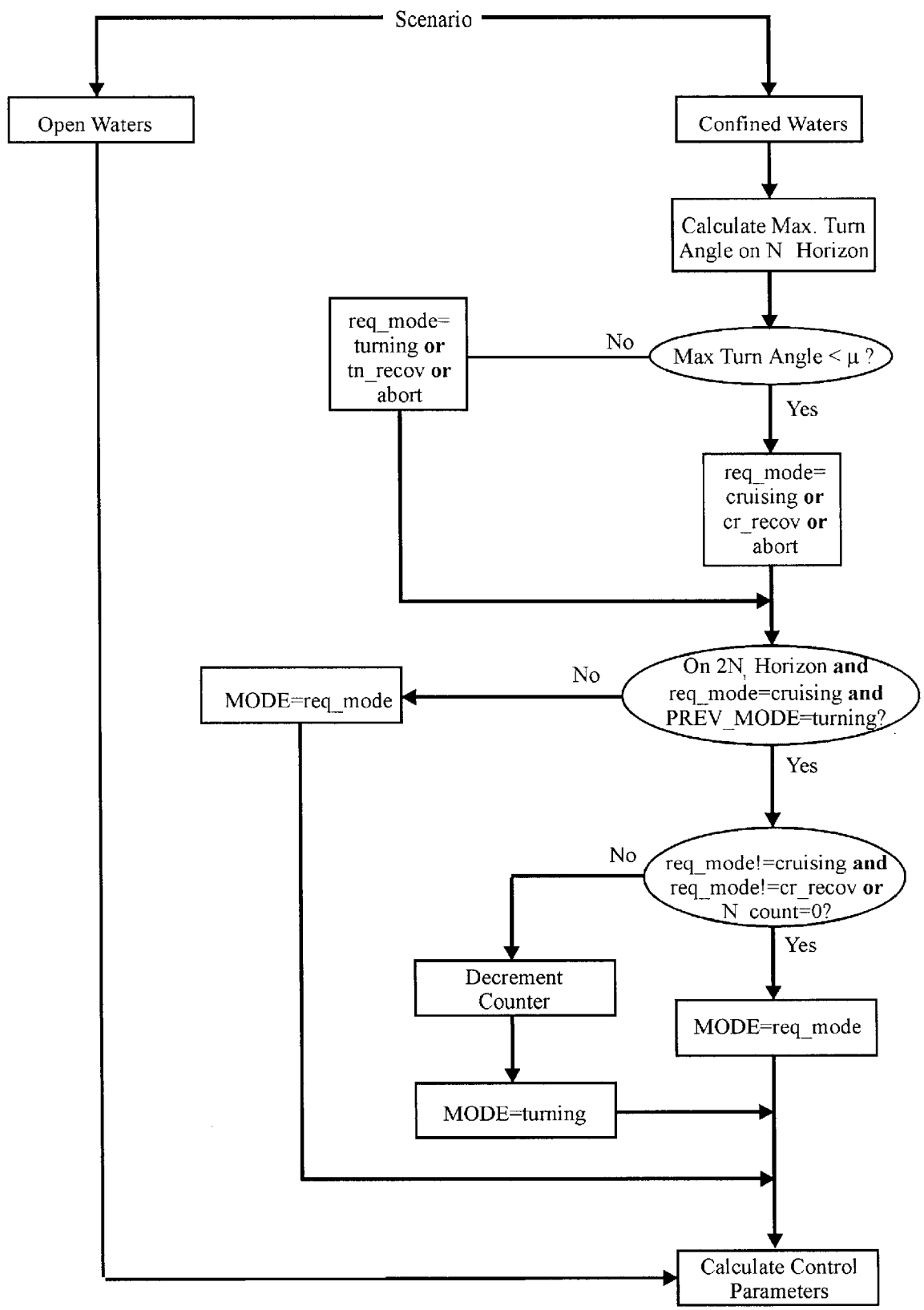
FIG. 15 is a simplified flow diagram of MGPC Operating Mode Selection.

A flow chart of the switching conditions is illustrated in FIG. 15.

The relationship between the modes of operation and tracking error are provided in Table 1.

TABLE 1

Error Conditions for Modes of Operation

| Mode of Operation | Error Condition |
|---|---|
| Cruising | $|e(t)| \leq K_c$ |
| Turning | $|e(t)| \leq K_T$ |
| Recovery | $K_c < |e(t)| \leq \overline{K}_c$ OR $K_T < |e(t)| \leq \overline{K}_T$ |
| Abort | $|e(t)| > \overline{K}_c$ OR $|e(t)| > \overline{K}_T$ |

Here, $K_C, \overline{K}_C, K_T$ and $\overline{K}_T$ are user-specified performance parameters that define when each mode is to be invoked (see Table 3).

The mode of operation is also contingent on the nature of the upcoming reference trajectory. The reference trajectory is defined by straight line segments drawn through a series of way-points. A pre-calculation is performed to determine the change in heading that the ship would encounter as it passes through the various way-points. That is the angle between consecutive line segments of the reference trajectory is calculated and is subsequently associated with the way-point that joins two line segments. The resultant angle is stored in the third column of a file opposite the associated way-point. If the absolute value of the angle is greater than the user-defined threshold μ, the way-point is interpreted as a turning way-point. If the angle is smaller than μ, the way-point is interpreted as a cruising way-point. Structuring the routine in this fashion allows implementation of different controllers for different modes of operation.

Turning Horizon $N_3$

In order to change the mode of operation to account for an upcoming turn, the controller must be able to look ahead and detect the upcoming turn. However, looking ahead $N_2$ time steps is insufficient since the prediction horizon associated with a cruising condition is typically smaller than the prediction horizon for a turning condition. As a result, when the controller switches from cruising to turning mode, part of the prediction horizon is past the turn thus reducing the effectiveness of the turning controller. To rectify this situation, a parameter $N_3$ denoted as the turning horizon, where ($N_3 \geq N_2$) under all circumstances, is introduced. This way, the controller is always looking ahead $N_3$ time steps to detect a turn. Since ($N_3 \geq N_2$), no part of the turning controller prediction horizon straddles the turning way-point.

There are several mechanisms required to implement this solution. Consider first the automatic detection of a turn. This is accomplished by assigning a line segment number to each ($x_r[i]$, $y_r[i]$) pair. Thus, for every iteration of the simulation loop, a vector of line segment numbers is generated. If the line segment numbers within this vector differ, this means that the turning horizon straddles a way-point. Since there is a potential change in heading angle associated with each way-point, it is determined if the way-point in question is a turning way-point or a cruising way-point based on the angle test outlined above. If there are multiple way-points straddled by the turn horizon, then the turning angle is defined as the sum of the changes in angle invoked by each way point on the turning horizon. If this turning angle is greater than the threshold, a turning mode is appropriate.

The turning horizon also serves another purpose. One of the problems with the implementation described in the previous paragraph is that the mode may switch back to cruising when the ship passes the turning way-point. This often results in poor performance. Thus, it was reasoned that the turning mode of operation should remain in effect for $N_3$ time steps after the ship has passed the turning way-point. Such an implementation resulted in superior performance. Once $N_3$ time steps have elapsed, the controller switches to whatever operational mode is appropriate unless a recovery or abort mode is requested.

Way-Point Horizon

In previous implementations of the autopilot, it was found that the controller tended to give priority to the geographical location of the way points instead of recognising the order in which the way points were to be processed. To rectify the situation, a method of identifying a processing order for the way-points needed to be instituted. This was done in conjunction with the turning horizon concept which utilises a vector that contains entries that identify the line segments on which each of the reference points for calculating the error vector for control lies. This same vector is used to formulate a way point horizon which contains only those line segments and corresponding way points that are within the turning horizon. This portion of the overall trajectory is then used to define the closest way-point and subsequently the error vector. This implementation ensures that the way-points are processed according to order and not according to geographical location.

Controller Parameter Selection

The control structure that is implemented is dependent on the mode of operation, the turning angle, and the speed of the ship. Table 2 outlines control parameters that may change when a controller update occurs.

TABLE 2

MGPC Controller Parameters

| Controller Parameter | Description |
| --- | --- |
| $N_1$ (Prediction Horizon Start) | Set to be zero or time delay plus one (user configurable) |
| N (Prediction Horizon Size) | Mode, speed and turning angle dependent Selected through interpolation of simulation data (automatic) |
| $N_2$ (Prediction Horizon End) | $N_2 = N_1 + N$ (automatic) |
| $N_u$ flag (Control Horizon) | Set equal to 0 ($N_u = 1$) or 1 ($N_u = N_2$) (user configurable) |
| $\alpha_c$ (Error Weighting) | Mode, speed and turning angle dependent Selected through interpolation of simulation data (automatic) |
| $\lambda_i = \lambda$ (Control Weighting) | Constant under all conditions Selected based on simulation studies (automatic) |

There are a number of performance parameters that are set to control operation of the autopilot. These parameters are listed in Table 3.

TABLE 3

ASAS Performance Parameters

| Performance Parameter | Description |
| --- | --- |
| $K_C$ | upper error limit for cruising mode lower error limit for cruise recovery mode |
| $\overline{K}_C$ | upper error limit for cruise recovery mode lower limit for cruising abort mode |
| $K_T$ | upper error limit for turning mode lower error limit for turning recovery mode |
| $\overline{K}_T$ | upper error limit for turning recovery mode lower limit for turning abort mode |
| $K_{OW}$ | lower limit for abort mode (Open Waters Scenario) |
| $\mu$ | defines the magnitude of heading changes of the reference trajectory which constitutes a turn |
| speed_thresh | defines the required change in speed of the ship required to institute a controller update |
| RPM_SLOPE | slope of the linear model relating propeller RPM to steady state speed |
| RPM_INTERCEPT | ordinate intercept of the linear model relating propeller RPM to steady state speed |
| ANGLE_DATA | turning angle data for interpolation (independent variable) |
| RPM_data | RPM data for interpolation (independent variable) |
| N_DATA | prediction horizon data as a function of turning angle and RPM (dependent variable) |
| ALPHA_DATA | error weighting sequence base as a function of turning angle and RPM (dependent variable) |

Controller Update

The MGPC controller is designed to update the control law whenever either of the two following conditions occur:
  The mode of operation has changed; or,
  The speed of the ship has changed by a pre-defined threshold.
When either of these conditions are true, a flag is set and the controller automatically updates its control parameters.

The simulation program utilizes a SPS executable to re-formulate the step response coefficient matrix for the new controller. This particular executable runs the nominal model only. When called, the SPS executable is initialized with all inputs set to zero except the number of iterations. Subsequently, the input vector used to pass information to the executable is updated with a unit step rudder command, the current RPM of the ship propeller, current speed, and the prediction horizon size. Once the SPS has generated the output file, it is read into the Matlab environment and the appropriate terms are extracted and used to populate the G matrix of the control law.

This function is also able to automatically set the value of $N_1$ to be equal to the time delay plus one. The user also has the option of setting $N_1=0$ as well.

GUI Design

A custom Graphical User Interface (GUI) was developed to emulate an overlay of an Electronic Charting system. The GUI allows a user to define a reference trajectory, set controller specific parameters, view operational and performance data, set initial conditions and view the progress of a simulation. One of the main objectives of the GUI was to approximate the display seen by a ship's pilot as closely as possible. The current version of the GUI operates in conjunction with the ship prediction software (SPS) and the control functions to simulate the operation of the autopilot.

Figure 18:
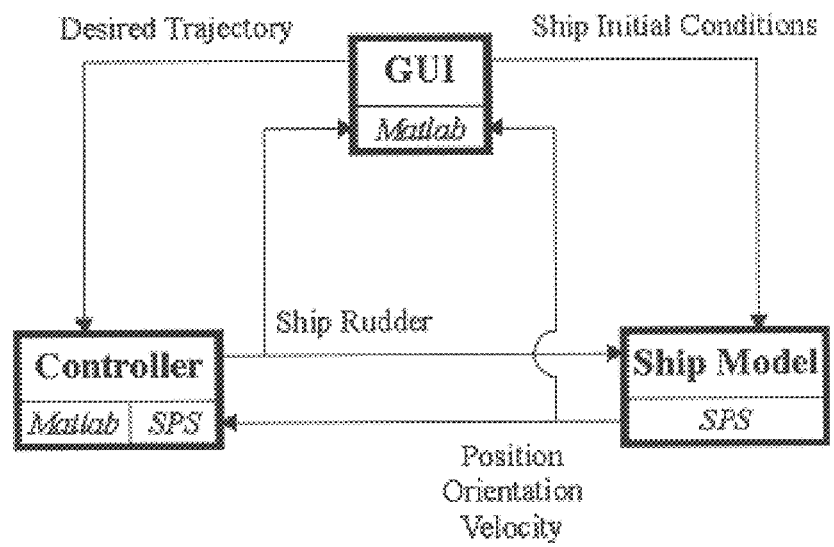
FIG. 18 is a simplified block diagram of ship autopilot.
Figure 19:
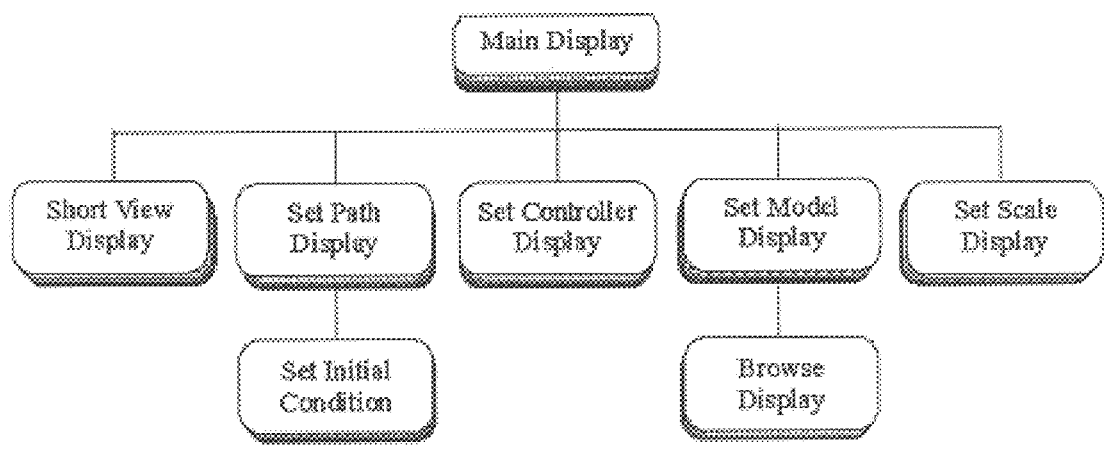
FIG. 19 is a simplified map of graphical user interface components for use with the invention.

The main MGPC controller and GUI have been implemented using the programming language Matlab™. This language allows integration of computation, visualization, and programming in a single environment. Both the GUI and the controller read the output file of the SPS and, when appropriate, write the necessary initialization files for the SPS. FIG. 18 illustrates the relationship between the GUI, the Controller and the Ship Model.

Figure 20:
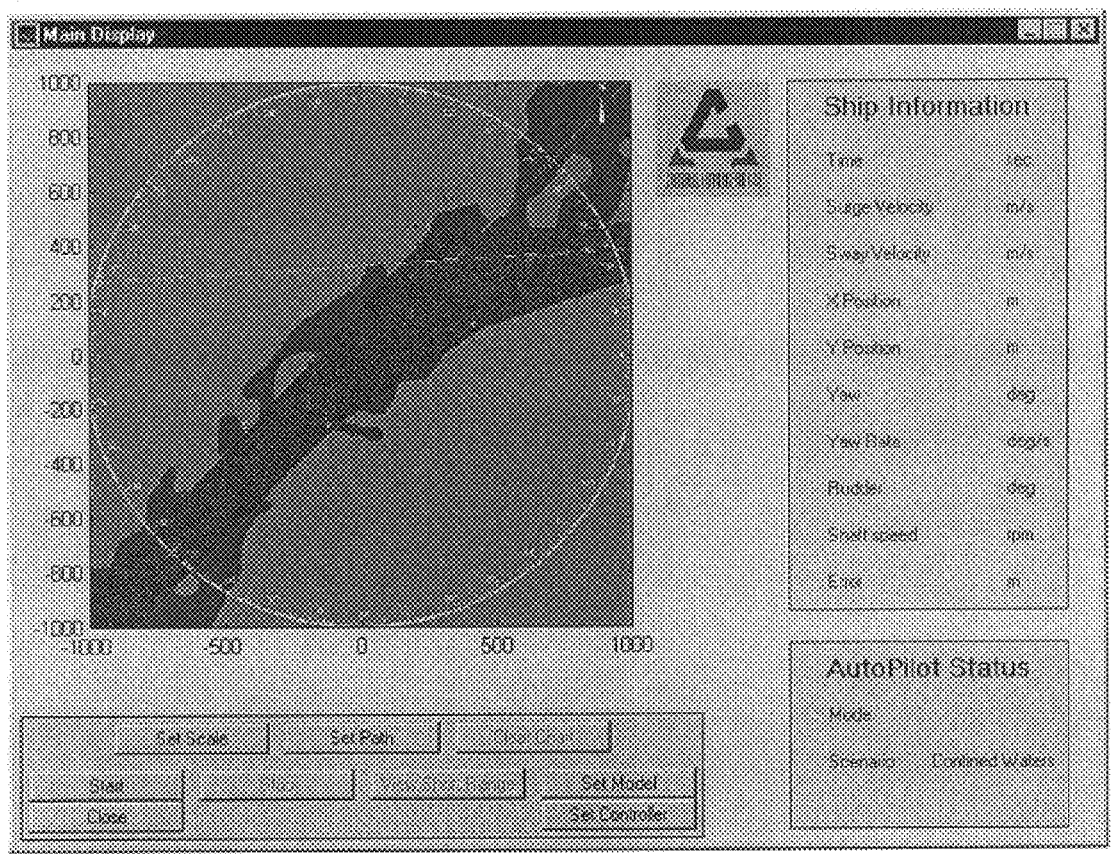
FIG. 20 is the graphical user interface main display.
Figure 21:
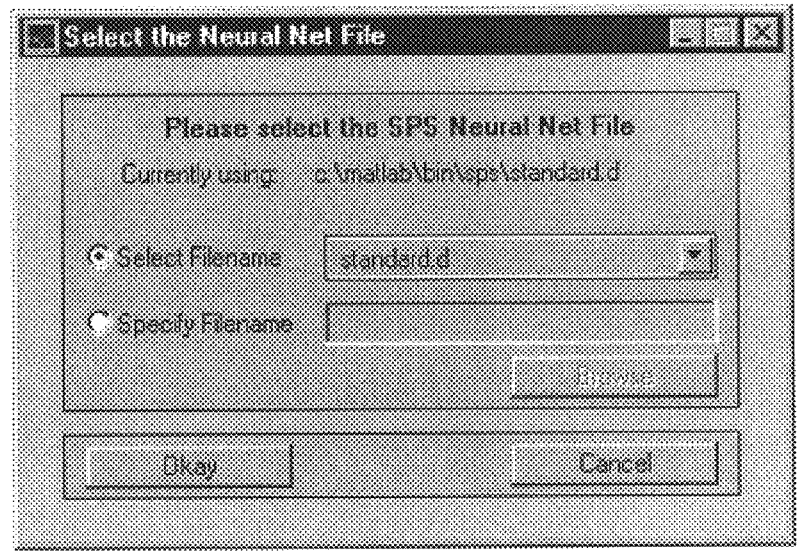
FIG. 21 is a sample GUI screen used to select the desired SPS neural net weighting file.

In a present embodiment, when the user starts the ship simulation package, the display illustrated in FIG. 20 appears. The main object in this display is the chart in the upper left portion of the screen.

On the chart, North is up and East is to the right. To be consistent with the SPS software co-ordinate frame, positive X is North, positive Y is East, and the heading is measured from due North in a clockwise direction.

To the immediate right of the chart, there is a section of the screen that is used to display the current ship status, i.e.
- the time elapsed in the simulation,
- the x/y position of the ship in the global fixed co-ordinate frame (X,Y),
- the surge/sway velocity,
- the heading,
- the yaw rate, and
- the propeller shaft speed (RPM).

The minimum distance from the ship to the desired trajectory is also displayed in this part of the screen (Error).

Below the ship status portion of the screen is a section that describes the operational disposition of the autopilot. The mode of operation (i.e. cruising, turning, recovery, abort) as well as the MGPC controller setting (i.e. Open Waterway, Confined Waterway) are displayed in this part of screen. The system utilizes the Confined Waters scenario as the default scenario with the option of selecting Open Waters scenario. In this fashion, the system defaults to the more precise tracking method enhancing safety in case of a user oversight.

Figure 22:
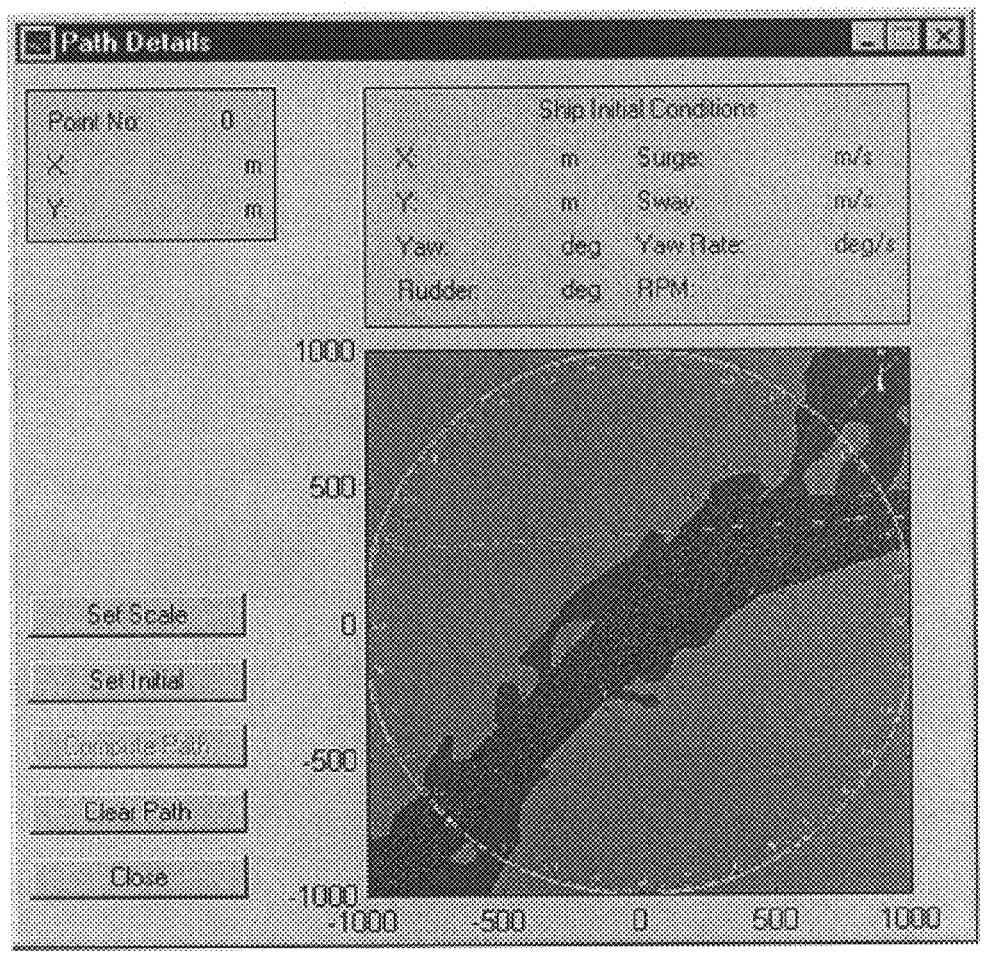
FIG. 22 is a sample GUI screen used to clear the way-points and/or ship initial conditions.

The SPS is being utilized as the model for the ship (See FIG. 18, Ship Model Block). An integral part of the SPS, is the neural network component. The synaptic weights for this neural network help model several hydrodynamic and environmental effects, so for different environmental conditions, different weights must be used. Currently, the weights are stored in a file and the GUI allows the user to select which weighting file is to be used. When the user presses the <Set Model> button on the main display, the window illustrated in FIG. 22 is opened and a weighting file can be loaded in order to provide user control over weighting data.

To define the desired trajectory, the user simply defines a set of way-points that the desired trajectory is to pass through. The user can define these way-points with a pointing device in the form of a mouse or with co-ordinates entered by hand. In the same fashion, the initial position of the ship can also be set.

Once all the necessary information has been entered, the <Start> button on the "Main Display" will be enabled. Pressing the <Start> button will begin the simulation. FIG. 22 shows what the "Main Display" looks like after 48 seconds of simulation. The yellow dotted line is the desired trajectory and the white solid line is a history of the ship position. Note that in our example, we are operating in the "Confined Waterways" scenario. Furthermore, note that at this point in the simulation, the ship is in a "cruising" mode (see the Autopilot Status section of the GUI in FIG. 22)

Figure 23:
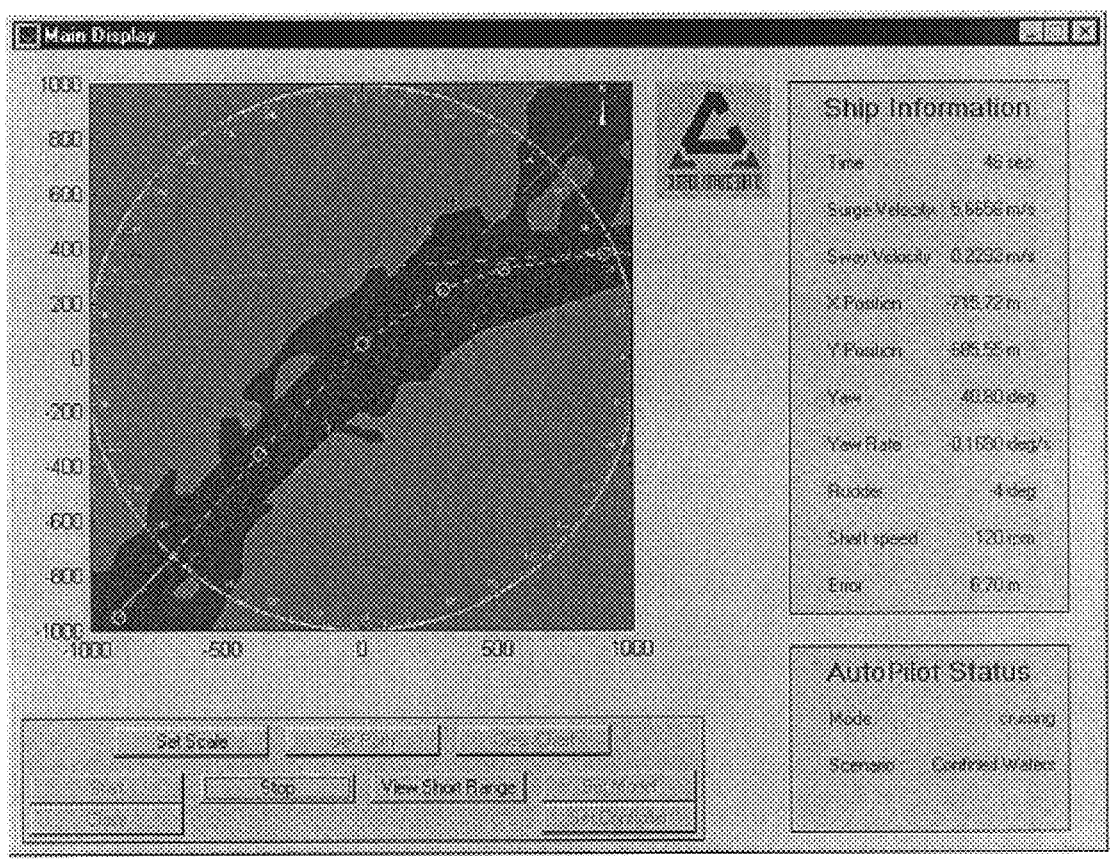
FIG. 23 is a sample graph of the simulation in "cruising" mode(confined waters)

For interest's sake, FIG. 23 shows the status of the simulation after 291 seconds. Note that the autopilot is in the "turning" mode. Once the simulation is done, several important pieces of data are available to generate performance evaluations of the autopilot. For example, FIG. 24 and FIG. 25 show the tracking error and rudder command profiles for this particular simulation.

Figure 26:
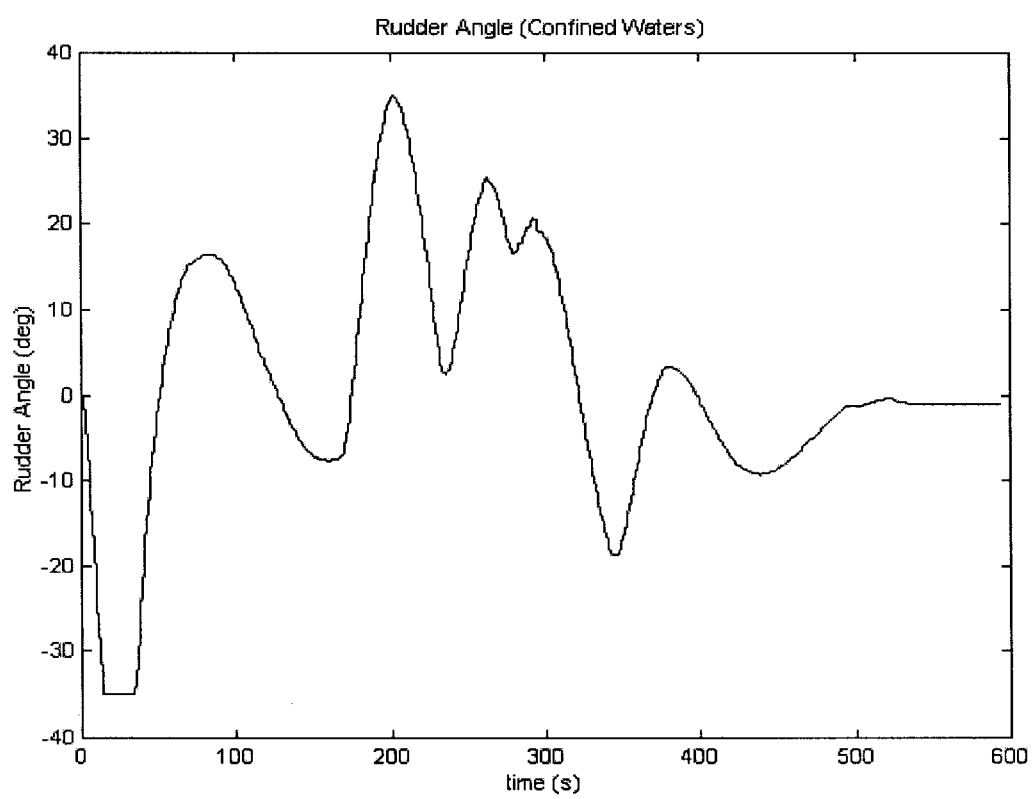
FIG. 26 is a sample graph of Rudder angle for global GPC controller (confined waters)

FIG. 26 illustrates what the GUI looks at the end of a second simulation. For the second simulation, the Open Waters scenario was used. (See the Autopilot Status part of the screen in FIG. 26) FIG. 27 and FIG. 28 show the tracking error and rudder angle for this particular simulation.

Figure 24:
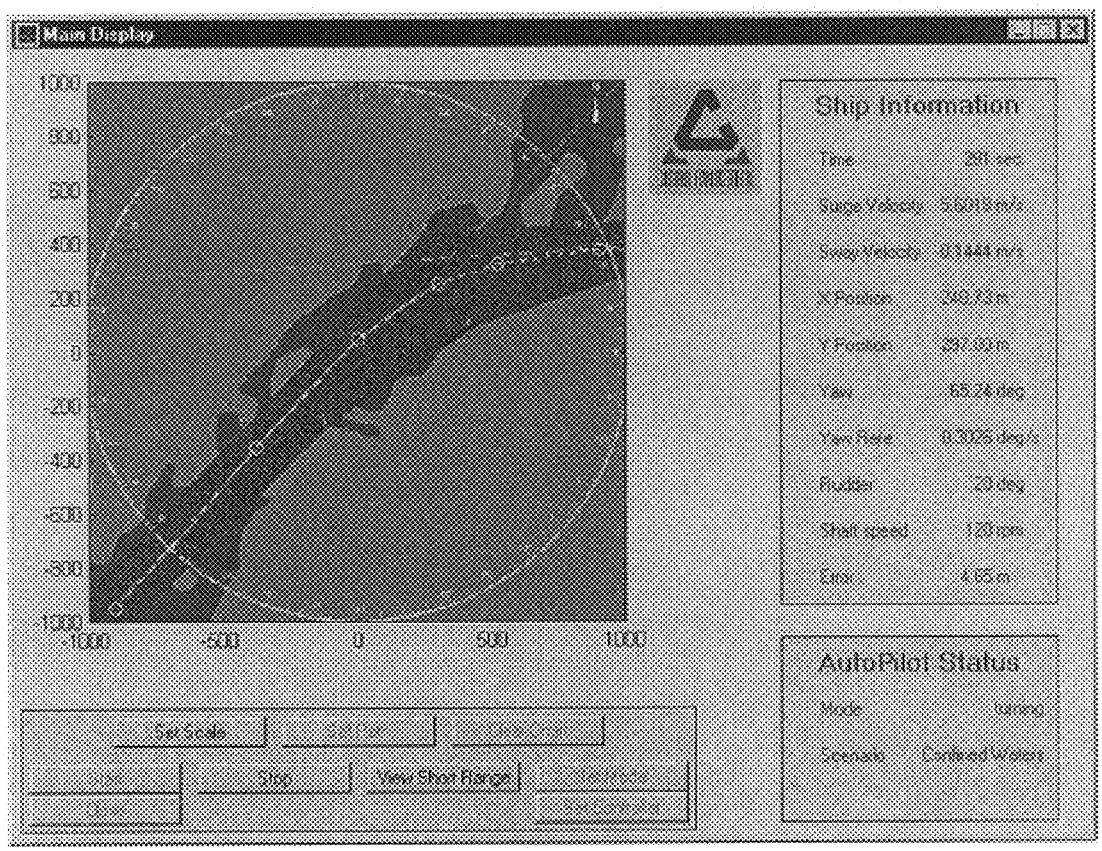
FIG. 24 is a sample graph the simulation in "turning" mode (confined waters)
Figure 25:
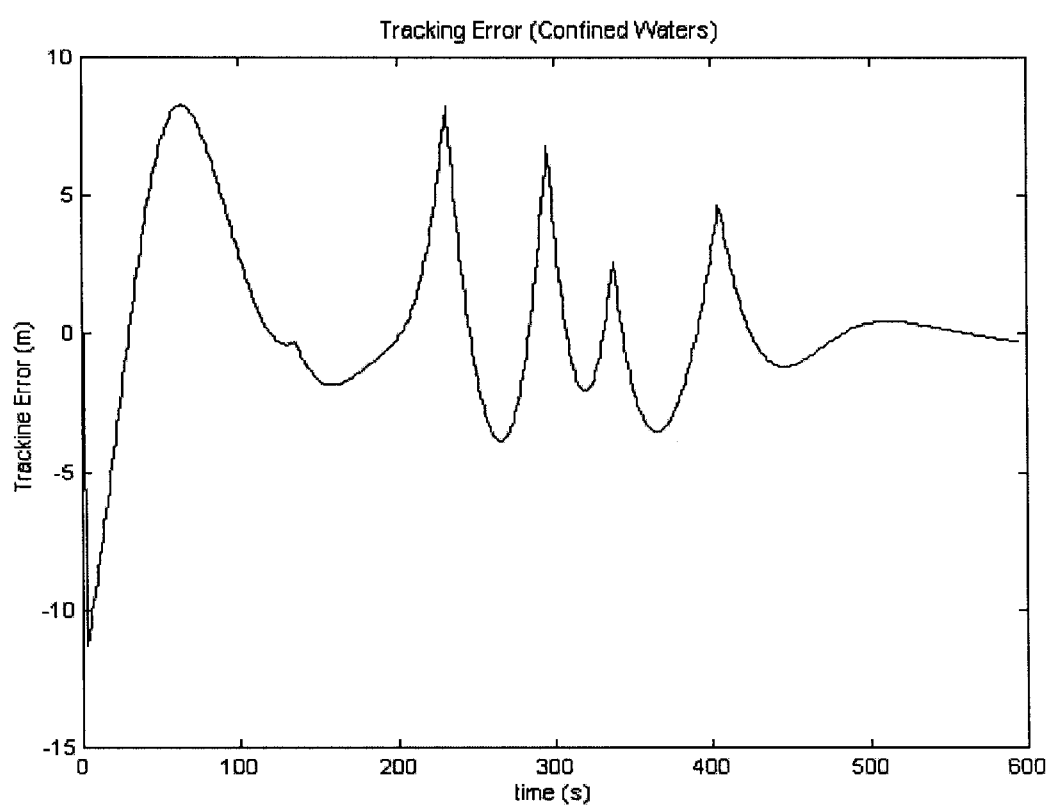
FIG. 25 is a sample graph of Tracking error for global GPC controller (confined waters)
Figure 27:
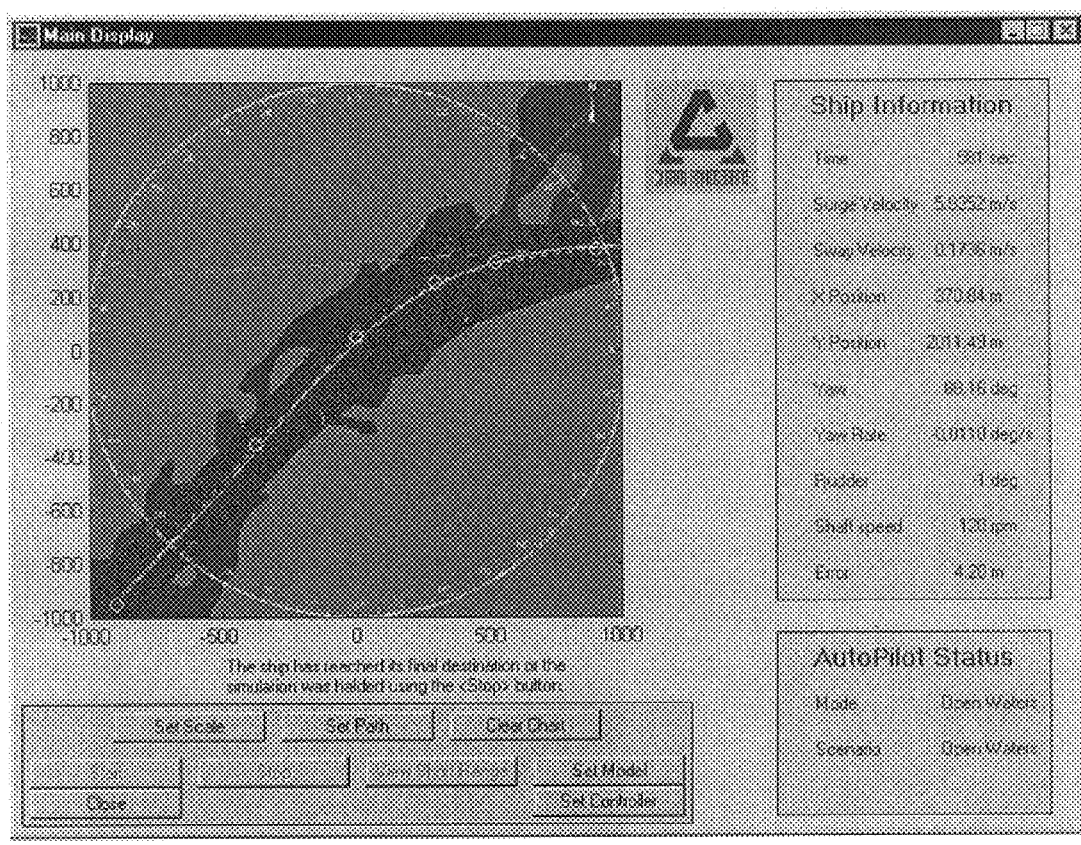
FIG. 27 is a sample graph of the simulation for the "open waters" scenario.
Figure 28:
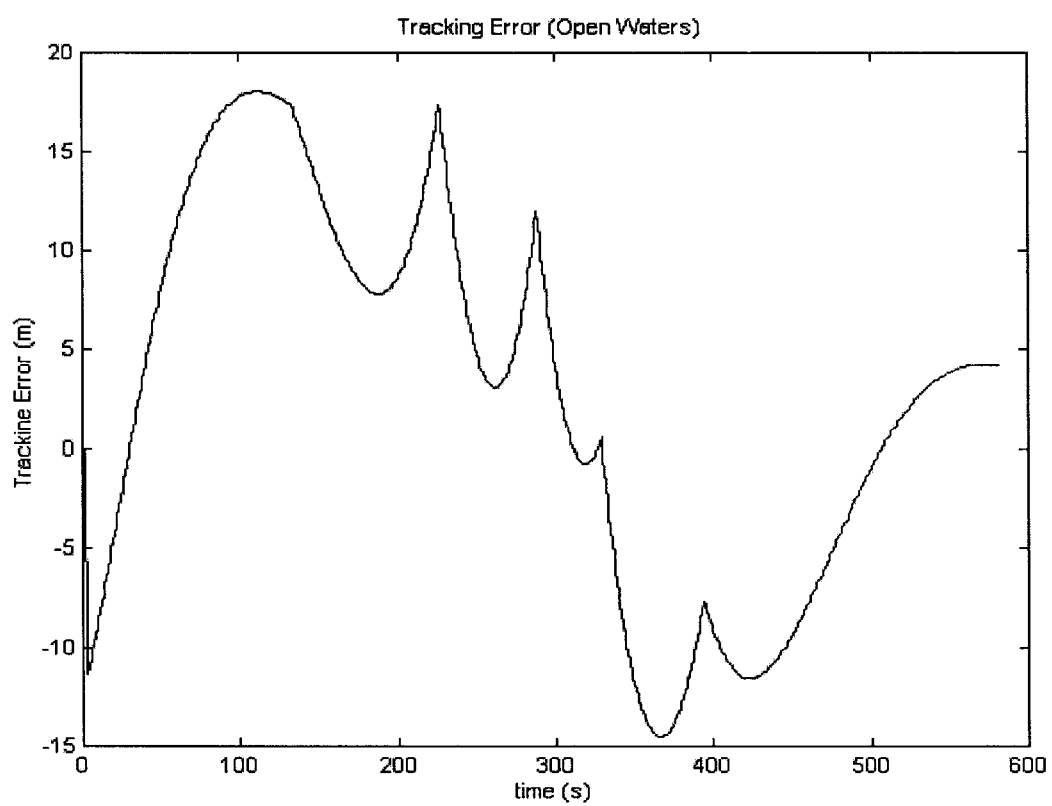
FIG. 28 is a sample graph error for global GPC controller (open waters)
Figure 29:
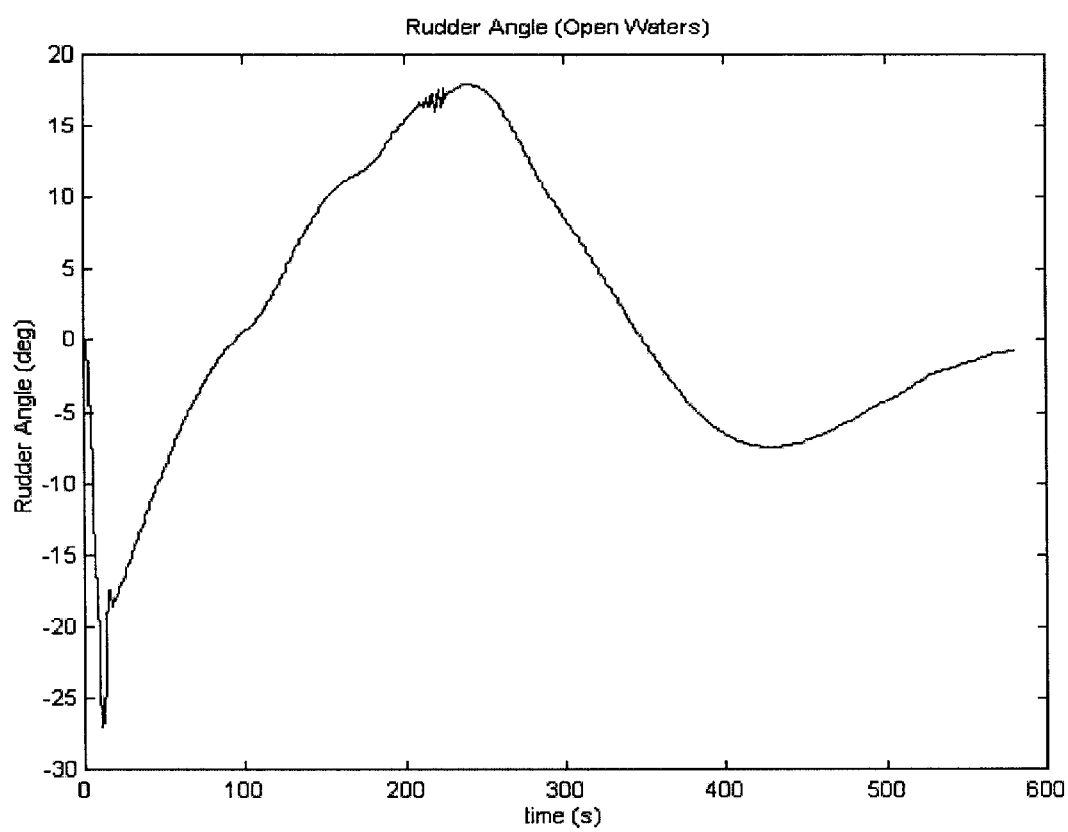
FIG. 29 is a sample graph of Rudder angle for global GPC controller (open waters)
Figure 30:
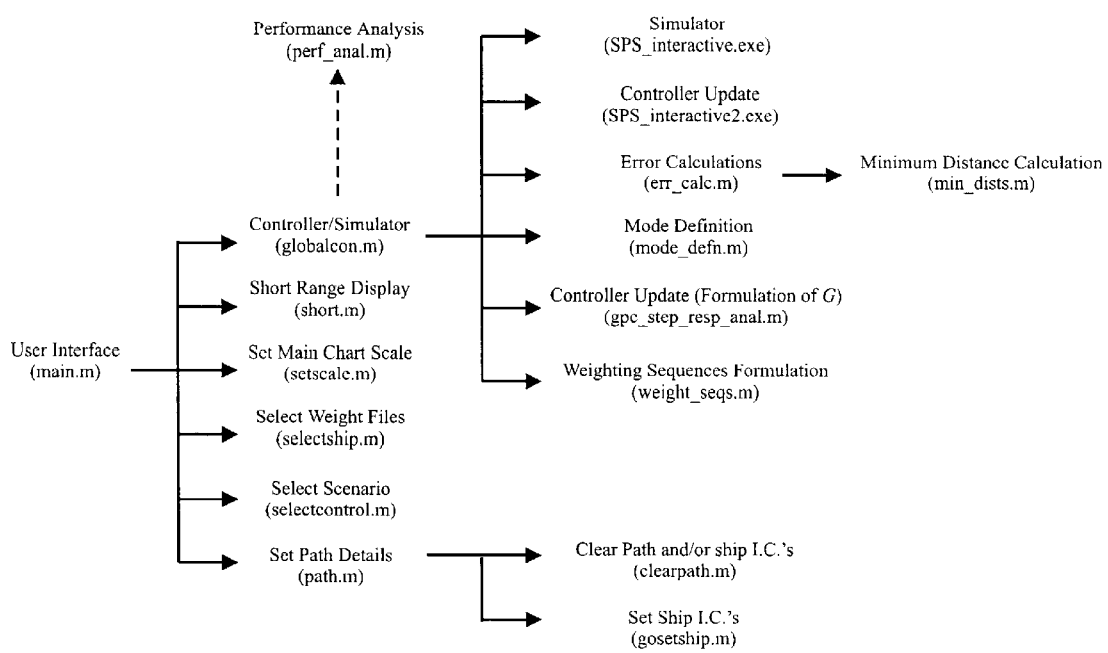
FIG. 30 is a simplified diagram of the Source Code Layout for a system according to the invention.

Comparing FIG. 25 and FIG. 28 it is clear that in the "Open Waters" scenario, the control effort is much less demanding, but as can be seen by comparing FIG. 24 and FIG. 27, it comes at a cost of larger tracking errors.

Simulation Study

A simulation study was conducted to determine the effectiveness and performance of the MGPC controller. The SPS was used as both the predictor and the process model. The parameters embedded into the SPS were from field trials of the M.V. Nanticoke, a 223 m long Great Lakes bulk carrier. This study examined the effect of ship speed, ship heading, reference trajectory characteristics, environmental disturbances, and operational scenarios. Another SPS executable was utilized to update the control structure when changes in operational conditions deemed it necessary. There were several situations where the tracking error, the difference between the actual and desired ship location, was less than 5 m 99% of the time for a 5 km simulation.

Other Applications of the Technology

The invention is also applicable to conventional and flexible robotics applications; autopilots for other vehicles such as aircraft, unmanned aerial vehicles, and ground vehicles; and industrial process control systems. Moreover, the technology is applicable to control problems that involve plants which are slow to respond to changes in control inputs since the predictive nature of the control algorithm is better able to prepare the process for changes in the set-point.

A portion of the software program code for implementing the embodiment described above is contained in Appendix A.

Numerous other embodiments may be envisaged without departing from the spirit or scope of the invention.

APPENDIX A

Functions and ModulesGUI Specific Functions (contain GUI IP):

```
main.m
function Main(action);
%MAIN
% GUI for ship autoguidance simulator.
% This file opens the 'Main Display' figure.
%Possible Actions:
%    'initiate'
%    'close'
%    'start'
%    'stop'
%    'view_short'
%    'set_scale'
%    'set_path'
%    'clear_chart'
%    'set_model'
%    'set_control'
setscale.m
function SetScale(action);
%SetScale
% This file opens the 'Set Scale' figure which contains the
% objects needed to allow the operator to change the scale
% that is displayed on the chart in the 'Main Display' figure
% possible actions:
%    'initiate'
%    'cancel'
%    'scale'
%    'type_scale'
%    'apply'
selectship.m
function selectship(action);
%selectship
% This file opens a figure that reads in all the
% '.d' neural net files located in 'c:\matlab\bin\sps'
% and allows the user to select the one he wishes to use
% for the simulation. Once the user selects the file to be used,
% this file is copied to 'c:\matlab\bin\sps\weights.d' i.e.
% the file that the sps software uses.
% possible actions:
%    'initiate'
%    'cancel'
%    'close'
selectcontrol.m
function selectcontrol(action);
%selectcontrol
% This file opens a figure that allows the user to
% select the operating scenario of the ship. ie. confined
% waterway or open waterway
% possible actions:
%    'initiate'
%    'cancel'
%    'close'
path.m
function Path(action);
%Path
% This file opens the 'Path Details' figure. It is in this
% figure that the operator sets the path that the ship is
% required to follow
% possible actions:
%    'initiate
%    'callBackDownInit'
%    'callBackDownModi'
%    'callBackDownInsert_Bef'
%    'callBackDownShipInit'
%    'callBackMotion'
%    'clear'
%    'compute'
%    'first'
%    'left1'
%    'right1'
%    'last'
%    'delete_point'
%    'modify'
%    'insert_bef'
%    'insert_aft'
%    'close'
%    'set_init'
```

APPENDIX A-continued

Functions and ModulesGUI Specific Functions (contain GUI IP):

```
%    'set_scale'
%    'rest_speed'
clearpath.m
function clearPath(action);
%clearPath
% This file opens the 'Clear' figure. This figure allows
% the operator to clear the entered initiate ship conditions,
% the entered path, or both.
% possible actions:
%    'initiate'
%    'path'
%    'init'
%    'both'
%    'clear'
%    'close'
gosetship.m
function goSetShip(action);
%goSetShip
% This file opens the 'Set Initial Ship Conditions' figure.
% This figure allows the operator to enter the initial
% conditions of the ship, its initial ship, yaw angle, and
% position
%
% possible actions:
%
%    'initiate'
%    'set_pos'
%    'yaw_enter'
%    'speed_enter'
%    'close_fig'
a) Controller Specific Functions:
globalcon.m (contains MGPC and scenario definition IP)
%GLOBALCON
% This program implements the GPC control algorithm over
% the full range of the SPS operating spectrum. Operating
% scenarios are defined and the controller parameters
% are set based on the current operating scenario.
%
% This implementation does not require the SPS to be rerun
% when the controller is updated.
%
% If t = 1, then some initialization is performed.
% If t > 1, then one iteration of the normal simulation is performed.
%
% Note that this file is based on a file 'global_con.m' written
% by K. Tuer (16/04/98)
% File name: globalcon
% Platform: Matlab 5.1
err_calc.m (contains tracking error definition and reference
trajectory definition IP)
function [halt,xr,yr,line_seg]=err_calc
(sps_out_file,way_file,N2,draw_plot)
%ERR_CALC
% This function calculates the error for the SPS GPC controller
% given the predicted trajectory and the desired trajectory.
%
% Syntax:
%    [halt,xr,yr,line_seg]=err_calc
%       (sps_out_file,way_file,N,draw_plot)
%
% The file 'sps_out_file' is the output file of the
% SPS software.
% The file 'way_file' contains the (x,y) co-ord. of the way points.
% The variable 'N2' is the prediction horizon (Assuming N1 = 1).
% If 'draw_plot' is 1, then plots are drawn
%
% The variable halt = 1 if the initial position of the ship
% is past the last way point.
% xr and yr are the positions on the desired path
% line_seg is a vector indicating which line segement each of the
% (xr,yr) points lie on
%
% Function name: err_calc
min_dists.m (contains tracking error definition and reference
trajectory definition IP)
function [dist,nearest,xn,yn]=mindists(point,
```

APPENDIX A-continued

Functions and ModulesGUI Specific Functions
(contain GUI IP):

```
    line_start,line_end)
%MINDIST - Find the minimum distance from a
%line segment to a point
%
% Syntax:
%   [dist,nearest]=mindists
      (point,line_start,line_end)
% Input:     - point    =[xp;yp]
%            - line_start =[x0;y0]
%            - line_end = [xf;yf]
% Output     - nearest =[xn,yn]
%            - dist
mode_defn.m (contains mode definition, slelction and
implementation IP)
function
[N,NN3,Nu_flag,con_update,error_cond,alpha_err,gamma_parm,
beta,alpha_con]=. . .
      mode_defn(curr_error,curr_vel,RPM,line_seg,
      way_angles,max_turn_angle)
%MODE_DEFN
% This function defines the mode of operation for the ASAS.
%
% Syntax:
%   [N,NN3,Nu_flag,con_update,error_cond,
%   alpha_err,gamma_parm,beta,alpha_con]=. . .
%      mode_defn(curr_error,curr_vel,
%      RPM,line_seg,way_angles,max_turn_angle)
%
% Input Parameters:
%   curr_err       = current ship tracking error
%   curr_vel       = current ship velocity
%   RPM            = current ship RPM
%   line_seg       = vector defining which line segment of
%                    the refernce trajectory that each (xr,yr)
%                    generated by err_calc lies on
%   way_angles     = the angles associated with each turn
%                    of the reference trajectory
%   max_turn_angle = the maximum turn on the turning
%                    horizon
%
% Output Parameters:
%   N         = prediction horizon
%   NN3       = prediction horizon for defining N3
%   Nu_flag   = flag to set control horizon Nu.
%               (Nu_flag=0, Nu=1 ; Nu_flag=1,
%   Nu=N2)
%   con_update = flag to indicate
%               that a controller update due to change in
%               mode is required (con_update=1, update ;
%               con_update=0, don't update)
%   error_cond = status monitoring vector
%               Syntax: [con_update abs(curr_error)
%               turn_angle]
%   alpha_err  = base of the error weighting sequence
%   gamma_parm = gain of the control weighting sequence
%   beta       = offset of the control weighting sequence
%   alpha_con  = base of the control weighting sequence
% Function name:    mode_defn
% Calling function: global_con
% Platform:         Matlab 5.1
gpc_step_resp_anal.m (contains MGPC IP)
function[G,Gx,N1,N2,Nu]=gpc_step_resp_anal
(Np,Nu_flag,u0,RPM,dt_flag,dwell)
%GPC_STEP_RESP_ANAL
% This function formualtes the step response coefficient
% matrix required for the GPC control law.
%
% Syntax:
%   [G,Gx,N1,N2,Nu]=gpc_step_resp_anal
%   (Np,Nu_flag,u0,RPM,dt_flag,dwell)
%
% Input Parameters:
%   Np      = prediction horizon
%   Nu_flag = flag to set control horizon Nu.
%             (Nu_flag=0,Nu=1 ; Nu_flag=1,
%   Nu=N2)
```

APPENDIX A-continued

Functions and ModulesGUI Specific Functions
(contain GUI IP):

```
%   u0      = speed of the ship
%   RPM     = propeller RPM
%   dt_flag = flag to enable (dt_flag=1)/disable
%             (dt_flag=0) dead time extraction
%   dwell   = time to wait before reading SPS output file
%
% Output Parameters:
%   G    = N x Nu step response coefficient matrix
%   Gx   = (N2-N1-1) x Nu step response coefficient matrix
%   N1   = start of prediction horizon
%   N2   = end of prediction horizon
%   Nu   = control horizon
% Function name:    gpc_step_resp_anal
% Calling function: global_con
% Platform:         Matlab 5.1
weight_seqs_m (contains MGPC IP)
      function [delta_err,lambda_con]=
            weight_seqs(n,alpha_err,Nu,gamma_parm,beta,
            alpha_con)
% WEIGHT_SEQS
% This function formulates the error and control weighting
% sequences for the GPC algorithm.
%
% Syntax:
% [delta_err,lambda_con]=
%      weight_seqs(N,alpha_err,Nu,gamma_parm,
%      beta,alpha_con)
%
% Input Parameters:
%      N       = prediction horizon
%      alpha_err = base of the error weighting sequence
%      Nu      = control horizon
%      gamma_parm = gain of the control weighting
%      sequence
%      beta    = offset of the control
%      weighting sequence
%      alpha_con = base of the
%      control weighting sequence
%
% Output Parameters:
%      delta_err = vector of weights for the error
%      weighting sequence
%      lambda_con = vector of weights
%      for the control weighting sequence
%
% Function name:    weight_seqs
% Calling function: global_con
% Platform:         Matlab 5.1
```

Glossary

| | |
|---|---|
| Advanced Ship Autopilot System | A joint project of CORETEC Incorporated and Control Advancements Canada Incorporated to develop a control system for marine vessels which utilises prediction of ship dynamics and an advanced predictive controller to allow precise automatic navigation even in confined waterways. |
| ASAS | Advanced Ship Autopilot System. |
| DMC | Dynamic Matrix Control. |
| EHAC | Extended Horizon Adaptive Control. |
| EPSAC | Extended Predictive Self-Adaptive Control. |
| GPC | Generalized Predictive Control. |
| GUI | Graphical User Interface. |
| IMC | Internal Model Control. |
| I/O | Input/Output |
| LOS | Line of Sight. |
| LQR | Linear Quadratic Regulator. |
| LRPC | Long Range Predictive Control. |
| LSA | Least Squares Algorithm. |
| LTI | Linear Time Invariant. |
| MAC | Model Algorithmic Control. |
| MGPC | Modified Generalised Predictive Controller. |
| NN | Neural Network. |

APPENDIX A-continued

| Functions and ModulesGUI Specific Functions (contain GUI IP): | |
|---|---|
| Ship Predictor System | A marine navigational aid which provides real-time precision predictions of future position, speed and heading of vessels. |

What is claimed is:

1. A method of navigation control for a vessel comprising the steps of:
   (a) providing a correlation processor for determining according to a non-linear correlation a set of predictions of vessel motion based on a set of sensory input values;
   (b) determining from the predictions and from actual vessel motion a control law of vessel motion;
   (c) using the control law, forming a predictive controller for providing a control signal indicative of navigation control; and,
   (d) at intervals updating the predictive controller based on another control law formed according to step (b).

2. A method according to claim 1, wherein the formed predictive controller is a modified generalised predictive controller.

3. A method according to claim 2, wherein the control law is updated at least once every 5 seconds and wherein predictive controller is modified at intervals.

4. A method according to claim 3, wherein the control law is updated based on changes in environmental conditions and based on an accuracy of past predictions.

5. A method of navigation control for a vessel according to claim 1, comprising the step of:
   (a1) providing a linear mathematical model for predicting vessel motion in conjunction with the correlation processor.

6. A method of navigation control for a vessel according to claim 5, wherein the mathematical model is a linear time varying mathematical model.

7. A method of navigation control for a vessel according to claim 6, wherein the control law is of the form of $\Delta\bar{u}(t)=K\bar{e}(t)$ and wherein K is of the form of $$K=K_p[\alpha^N \alpha^{N1} \ldots \alpha^1 \alpha^0],$$

where $\bar{u}(t)$ is the control signal to the vessel, K is the CPC gain and, $\bar{e}(t)$ is a difference between a desired heading and a predicted heading.

8. A method of navigation control for a vessel according to claim 7, wherein $\alpha$ is between 0.8 and 1.2.

9. A method of navigation control for a vessel according to claim 8, wherein N is between 80 and 120.

10. A method of navigation control for a vessel according to claim 9, wherein $K_p$ is less than approximately 0.02.

11. A method of navigation control for a vessel according to claim 5, wherein the mathematical model is a linear time invariant mathematical model determined recursively.

12. A method of navigation control for a vessel according to claim 1, comprising the step of selecting a mode of operation from a plurality of supported modes of operation in which for the controller to operate.

13. A method of navigation control for a vessel according to claim 12, wherein the supported modes include turning mode and cruising mode.

14. A method of navigation control for a vessel according to claim 13, wherein the step of selecting a mode of operation is performed in advance by predicting vessel navigation within a turning horizon.

15. A method of navigation control for a vessel according to claim 14, comprising the step of when in turning mode, maintaining the turning mode until a predetermined time has elapsed since the turn was completed.

16. A method of navigation control for a vessel according to claim 14, wherein the supported modes include recovery mode and abort mode.

17. A method according to claim 2, wherein the controller is capable of track-keeping, course-keeping, position keeping, stabilization, berthing, and speed control.

18. A navigation control system comprising:
   a correlation processor for determining according to a non-linear correlation a set of predictions based on a set of sensory input values; and,
   a modified generalized predictive controller designed based on the correlation processor predictions for providing a control signal indicative of navigation control.

19. A system according to claim 18, wherein the modified generalized predictive controller is designed based on a linear time varying model determined from correlation processor predictions.

20. A system according to claim 19, wherein the correlation processor is a neural network.

21. An automated ship navigation control system for controlling a ship's navigation comprising:
   a correlation processor for receiving input values and for determining according to a non-linear correlation of those values a set of predictions relating to ship navigation;
   a sensor for determining the ship location and for providing a location signal indicative of the determined ship location to the correlation processor;
   a sensor for sensing a slip state, the ship state including a physical setting of a ship system, and for providing a ship state signal indicative of the sensed ship state to the correlation processor;
   means for providing values relating to a current control signal to the correlation processor;
   a modified generalized predictive controller based on a time varying linear model determined from the set of predictions front the correlation processor and for providing a control signal indicative of navigation control, the modified generalized predictive controller for controlling differently in dependence upon at least one of a mode of operation and variations in the accuracy of the controller to cause the vessel to navigate along a predetermined path.

22. A system according to claim 21, wherein the sensor for sensing a ship state comprises a sensor for providing a signal relating to a position of the ship's rudder.

23. A system according to claim 21, wherein the correlation processor is an adaptive correlation processor adaptable in response to a determined accuracy of past predictions.

24. A system according to claim 21, wherein the modified generalized predictive controller is an adaptive generalized predictive controller adaptable in response to a determined effect of past control signals.

25. A system according to claim 21, wherein the modified generalized predictive controller is an adaptive generalized predictive controller adaptable in response to an accuracy of past predictions.

26. A system according to claim 21, wherein the correlation processor is a neural network.

27. An automated ship navigation control system for controlling a ship's navigation according to claim 21, for use in navigation control of a ship.

28. A method of control for a process comprising the steps of:
   (a) providing a correlation processor for determining according to a non-linear correlation a set of predictions of process progress based on a set of sensory input values;
   (b) determining from the predictions and from actual process progress a control law of the process;
   (c) using the control law, forming a predictive controller for providing a control signal indicative of process control; and,
   (d) at intervals updating the predictive controller based on another control law formed according to step (b).

29. A method according to claim 28, wherein the formed predictive controller is a modified generalised predictive controller.

30. A method according to claim 29, wherein the control law is updated at least once every 5 seconds and wherein predictive controller is modified at intervals.

31. A method according to claim 30, wherein the control law is updated based on changes in environmental conditions and based on an accuracy of past predictions.

* * * * *